United States Patent [19]
Tran

[11] Patent Number: 6,003,128
[45] Date of Patent: *Dec. 14, 1999

[54] NUMBER OF PIPELINE STAGES AND LOOP LENGTH RELATED COUNTER DIFFERENTIAL BASED END-LOOP PREDICTION

[75] Inventor: Thang M. Tran, Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/846,656

[22] Filed: May 1, 1997

[51] Int. Cl.[6] .......................................................... G06F 9/32
[52] U.S. Cl. .............................. 712/241; 712/23; 712/239
[58] Field of Search .................................... 395/580, 588, 395/800, 23; 712/239, 241, 23

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,764,861 | 8/1988 | Shibaya | 712/207 |
| 4,807,115 | 2/1989 | Torng | 712/215 |
| 4,858,105 | 8/1989 | Kuriyama et al. | 712/235 |
| 4,928,223 | 5/1990 | Dao et al. | 712/247 |
| 5,053,631 | 10/1991 | Perlman et al. | 708/508 |
| 5,058,048 | 10/1991 | Gupta et al. | 708/508 |
| 5,101,484 | 3/1992 | Kohn | 712/241 |
| 5,129,067 | 7/1992 | Johnson | 712/213 |
| 5,136,697 | 8/1992 | Johnson | 712/239 |

(List continued on next page.)

FOREIGN PATENT DOCUMENTS

| | | |
|---|---|---|
| 0259095 | 3/1988 | European Pat. Off. |
| 0381471 | 8/1990 | European Pat. Off. |
| 0459232 | 12/1991 | European Pat. Off. |
| 2263985 | 8/1993 | United Kingdom. |
| 2263987 | 8/1993 | United Kingdom. |
| 2281422 | 3/1995 | United Kingdom. |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

*Primary Examiner*—Kenneth S. Kim
*Attorney, Agent, or Firm*—Conley, Rose & Tayon, PC; B. Noel Kivlin

[57] ABSTRACT

An apparatus for prediction of loop instructions. Loop instructions decrement the value in a counter register and branch to a target address (specified by an instruction operand) if the decremented value of the counter register is greater than zero. The apparatus comprises a loop detection unit that detects the presence of a loop instruction in the instruction stream. An indication of the loop instruction is conveyed to a reorder buffer which stores speculative register values. If the apparatus is not currently processing the loop instruction, a compare value corresponding to the counter register prior to execution of the loop instruction is conveyed to a loop prediction unit. The loop prediction unit also increments a counter value upon receiving each indication of the loop instruction. This counter value is then compared to the compare value conveyed from the reorder buffer. If the counter value is one less than the compare value, a signal is asserted that indicates that the loop instruction should be predicted not-taken upon a next iteration of the loop. In this manner, loop prediction accuracy may be increased by correctly predicting the loop instruction not-taken. Because loops are commonly found in a variety of applications, increasing the accuracy of loop prediction, even slightly, may have a beneficial effect on performance. The loop operation is particularly important in scientific applications where it may be used to perform various digital signal processing routines and to traverse arrays.

19 Claims, 12 Drawing Sheets

U.S. PATENT DOCUMENTS

| | | | |
|---|---|---|---|
| 5,226,126 | 7/1993 | McFarland et al. | 712/218 |
| 5,226,130 | 7/1993 | Favor et al. | 712/238 |
| 5,303,355 | 4/1994 | Gergen et al. | 712/241 |
| 5,404,473 | 4/1995 | Papworth et al. | 712/241 |
| 5,421,020 | 5/1995 | Levitan | 712/237 |
| 5,646,974 | 7/1997 | Wu et al. | 377/15 |
| 5,740,419 | 4/1998 | Potter | 712/241 |
| 5,752,015 | 5/1998 | Henry et al. | 712/241 |
| 5,764,970 | 6/1998 | Rana et al. | 712/233 |
| 5,774,711 | 6/1998 | Henry et al. | 712/244 |
| 5,784,607 | 7/1998 | Henry et al. | 712/245 |
| 5,909,573 | 6/1999 | Sheaffer | 712/240 |

```
mov 2 → cx
a:
    push cx
    mov 4 → cx
    b:
        push cx
        mov 3 → cx
        c:
            IN1
            IN2
            IN3
        loop c
        pop cx
    loop b
    pop cx
loop a
```

NUMBER OF PIPELINE STAGES AND LOOP LENGTH RELATED COUNTER DIFFERENTIAL BASED END-LOOP PREDICTION

BACKGROUND OF THE INVENTION

1. Field of the Invention

The present invention relates to the field of microprocessors and, more particularly, to branch prediction mechanisms within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

An important feature of a superscalar microprocessor (and a superpipelined microprocessor as well) is its branch prediction mechanism. The branch prediction mechanism indicates a predicted direction (taken or not-taken) for a branch instruction, allowing subsequent instruction fetches to continue with the predicted instruction stream indicated by the branch prediction. The predicted instruction stream includes instructions immediately subsequent to the branch instruction in memory if the branch instruction is predicted not-taken, or the instructions at the target address of the branch instruction if the branch instruction is predicted taken. Instructions from the predicted instruction stream may be speculatively executed prior to execution of the branch instruction, and in any case are placed into the instruction processing pipeline prior to execution of the branch instruction. If the predicted instruction stream is correct, then the number of instructions executed per clock cycle is advantageously increased. However, if the predicted instruction stream is incorrect (i.e. one or more branch instructions are predicted incorrectly), then the instructions from the incorrectly predicted instruction stream are discarded from the instruction processing pipeline and the number of instructions executed per clock cycle is decreased.

One type of instruction for which branch prediction techniques are employed is the loop instruction. A loop instruction is used to execute a loop, or sequence of instructions, a number of times in succession. The number of executions, or iterations, of the loop is known as the loop count. The loop count is typically set by initializing a specified register prior to execution of the loop. In many cases, the specified register is pre-defined by the loop instruction. As used herein, the specified register used by the loop instruction is referred to as the "counter register".

A loop is delimited by the loop instruction, which executes as the last instruction in the loop. The loop instruction decrements the counter register (previously initialized with the loop count) and branches to a specified target address if the counter register is greater than zero. Since the specified target address is located at the beginning of the loop, branching to the specified target address causes another iteration of the loop to be performed. This sequence continues until the counter register is equal to zero. In this case, the loop instruction does not branch to the specified target address. Instead, execution continues with instructions located subsequent to the loop instruction in memory.

One example of a loop instruction is the "LOOP" instruction defined by x86 instruction set. This instruction uses the ECX register (or CX register, if operating in 16-bit mode) as the counter register. Similar to a generic loop instruction described above, the x86 "LOOP" instruction operates by decrementing the value in the counter register and branching to a target address specified as an operand of the instruction if the new value of the counter register is greater than zero.

In many cases, loop instructions are always predicted to be taken. In this manner, the prediction mechanism is correct in every iteration of the loop except the last one. For many implementations, this technique represents an acceptable level of accuracy. As the number of pipeline stages in microprocessors increases due to higher clock frequencies, however, the penalty for mispredicted branches increases as well. It thus becomes important to improve branch prediction accuracy as much as possible.

It would therefore be desirable to increase the accuracy of the branch prediction mechanism used in conjunction with the loop instruction.

SUMMARY OF THE INVENTION

The problem outlined above is in large part solved by a branch prediction method in accordance with the present invention. In one embodiment, an apparatus for prediction of loop instructions is provided. Loop instructions decrement the value in a counter register and branch to a target address (specified by an instruction operand) if the decremented value of the counter register is greater than zero. The apparatus comprises a loop detection unit that detects the presence of a loop instruction in the instruction stream. An indication of the loop instruction is conveyed to a reorder buffer which stores speculative register values. If the apparatus is not currently processing the loop instruction, a compare value corresponding to the counter register prior to execution of the loop instruction is conveyed to a loop prediction unit. The loop prediction unit also increments a counter value upon receiving each indication of the loop instruction. This counter value is then compared to the compare value conveyed from the reorder buffer. If the counter value is one less than the compare value, a signal is asserted that indicates that the loop instruction should be predicted not-taken upon a next iteration of the loop. In this manner, loop prediction accuracy may be increased by correctly predicting the loop instruction not-taken. Because loops are commonly found in a variety of applications, increasing the accuracy of loop prediction, even slightly, may have a beneficial effect on performance. The loop operation is particularly important in scientific applications where it may be used to perform various digital signal processing routines and to traverse arrays. In the x86 instruction set, one of eight registers defined by the architecture is dedicated to the loop count.

Loop prediction accuracy may be further increased by including a loop count cache that stores counter register values corresponding to previous executions of the loop.

This improves prediction accuracy in cases in which loop execution time is short and a valid counter register value is needed quickly. Prediction accuracy may be increased for nested loops by storing both the counter values and the compare values in a stack memory structure.

Broadly speaking, the present invention contemplates a method for predicting a loop instruction comprising detecting the loop instruction during each of one or more iterations of a loop defined by the loop instruction and conveying an indication thereof. The method further comprises conveying a compare value corresponding to a specified register to a loop prediction unit in response to receiving the indication during a first of the one or more iterations of the loop. An execution of the loop instruction decrements a register value stored in the specified register and branches unless the register value is equal to zero. The method still further comprises incrementing a counter value in response to receiving the indication during each of one or more iterations of the loop. The method also comprises comparing the counter value to the compare value upon incrementing the counter value, and predicting a not-taken outcome for the loop instruction during a next of the one or more iterations of the loop in response to the counter value being one less than the compare value.

The present invention further contemplates an apparatus for predicting a loop instruction comprising a loop detection unit configured to convey an indication of the loop instruction during each of one or more iterations of a loop defined by the loop instruction in response to detecting the loop instruction. An execution of the loop instruction decrements a register value stored in a specified register and branches unless the register value is equal to zero. The apparatus further comprises a reorder buffer configured to convey a compare value in response to the indication received during a first of the one or more iterations of the loop, wherein the compare value corresponds to a value of the specified register. The apparatus also comprises a loop prediction unit coupled to receive the indication from the loop detection unit and the compare value from the reorder buffer. The loop prediction unit is configured to increment a counter value and compare the counter value to the compare value upon receiving the indication during each of one or more iterations of the loop. The loop prediction unit is further configured to signal a not-taken prediction for the loop instruction during a next of the one or more iterations of the loop in response to the counter value being one less than the compare value.

The present invention also contemplates a superscalar microprocessor, comprising a branch prediction unit configured to predict an outcome of a loop instruction during each of one or more iterations of a loop defined by the loop instruction. The superscalar microprocessor further comprises a loop detection unit coupled to receive the loop instruction from an instruction cache and configured to convey an indication thereof during each of one or more iterations of the loop. The superscalar microprocessor still further comprises a reorder buffer configured to convey a compare value in response to receiving the indication conveyed by the loop detection unit during a first of the one or more iterations of the loop. The superscalar microprocessor also comprises a loop prediction unit coupled to receive the compare value from the reorder buffer and the indication from the loop detection unit, and configured to increment a counter value and compare the counter value to the compare value upon receiving the indication during each of one or more iterations of the loop. The loop prediction unit is further configured to convey a not-taken indication to the branch prediction unit for the loop instruction during a next of the one or more iterations of the loop in response to the counter value being one less than the compare value.

BRIEF DESCRIPTION OF THE DRAWINGS

Other objects and advantages of the invention will become apparent upon reading the following detailed description and upon reference to the accompanying drawings in which.

Figure 1:
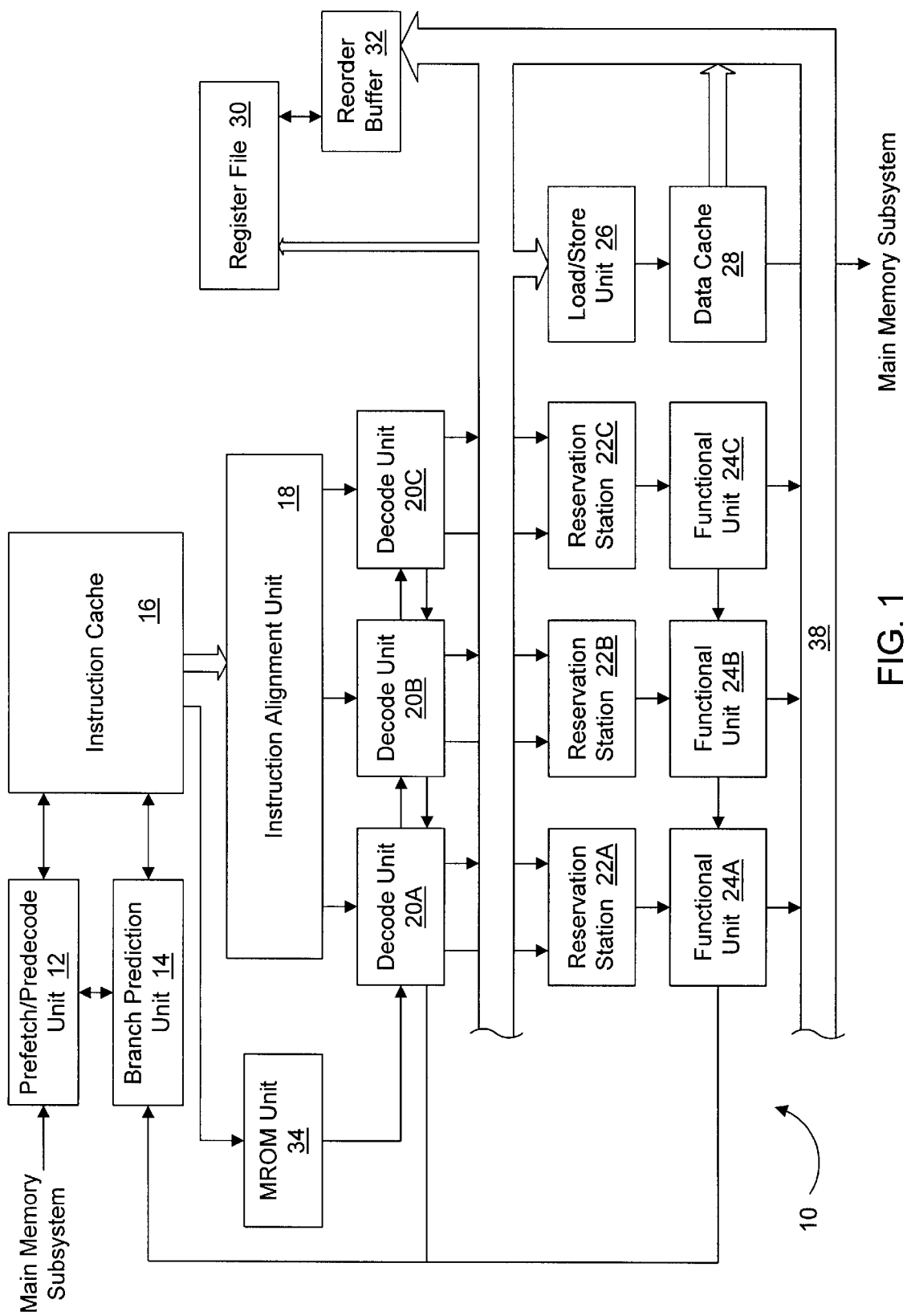
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, microprocessor 10 employs a loop prediction unit to increase the prediction accuracy of loop instructions. Loop instructions decrement a counter register and branch to a target address (specified as an instruction operand) if the counter register is greater than zero. Microprocessor 10 is configured to detect these loop instructions in the instruction stream. In one embodiment, this operation is performed within reorder buffer 32. In a different embodiment, this operation is performed as part of branch prediction unit 14. In any case, an indication of a loop instruction is conveyed to reorder buffer 32 and a loop prediction unit. Logic that detects the loop instruction in the instruction stream may be referred to as a "loop detection unit".

The loop prediction unit, which may also be implemented in a variety of locations including branch prediction unit 14 and reorder buffer 32, conveys a request for a compare value to reorder buffer 32 during the first iteration of a given loop. The compare value requested from reorder buffer 32 corresponds to the value of the counter register prior to execution of the loop instruction in this first iteration of the given loop. Reorder buffer 32 continuously monitors result buses 38 for instructions which update the counter register. These updates are stored in a shadow register within reorder buffer 32. The compare value is thus supplied from this register. Once the compare value is conveyed for a given loop, the shadow register is frozen.

Reorder buffer 32 determines if the compare value is currently available, since the counter register may be the destination operand of an instruction that has not yet computed its results. If the value is available, the data is conveyed to the loop prediction unit from reorder buffer 32 or from register file 30 via reorder buffer 32. If the value is not yet available, reorder buffer 32 either conveys a tag value to the loop prediction unit (which can then be used to monitor result bus 38 until the value is determined) or delays conveying the compare value until the data is available. Additionally, the loop prediction unit initializes and increments a counter value upon receiving an indication of a particular loop instruction during the first iteration of a given loop.

As execution of the loop continues, the loop detection unit continues to detect and convey indications of the loop instructions being processed. The loop prediction unit increments its counter value for each indication of a loop instruction that it receives. After incrementing the counter value, the loop prediction unit compares the counter value to the compare value conveyed by reorder buffer 32. If the counter value is one less than the compare value (i.e., the next iteration of the loop is the last) the loop prediction unit signals branch prediction unit 14 to predict the outcome of the next loop instruction (executed during the next iteration of the loop) to be not-taken.

In many cases, employing this mechanism may lead to increased loop prediction accuracy. Loop prediction may be further increased by including a loop count cache in the loop prediction unit which quickly supplies the compare value used in the last execution of the loop. Prediction accuracy for nested loops may be improved by storing compare and counter values for outer loops in a stack memory structure.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
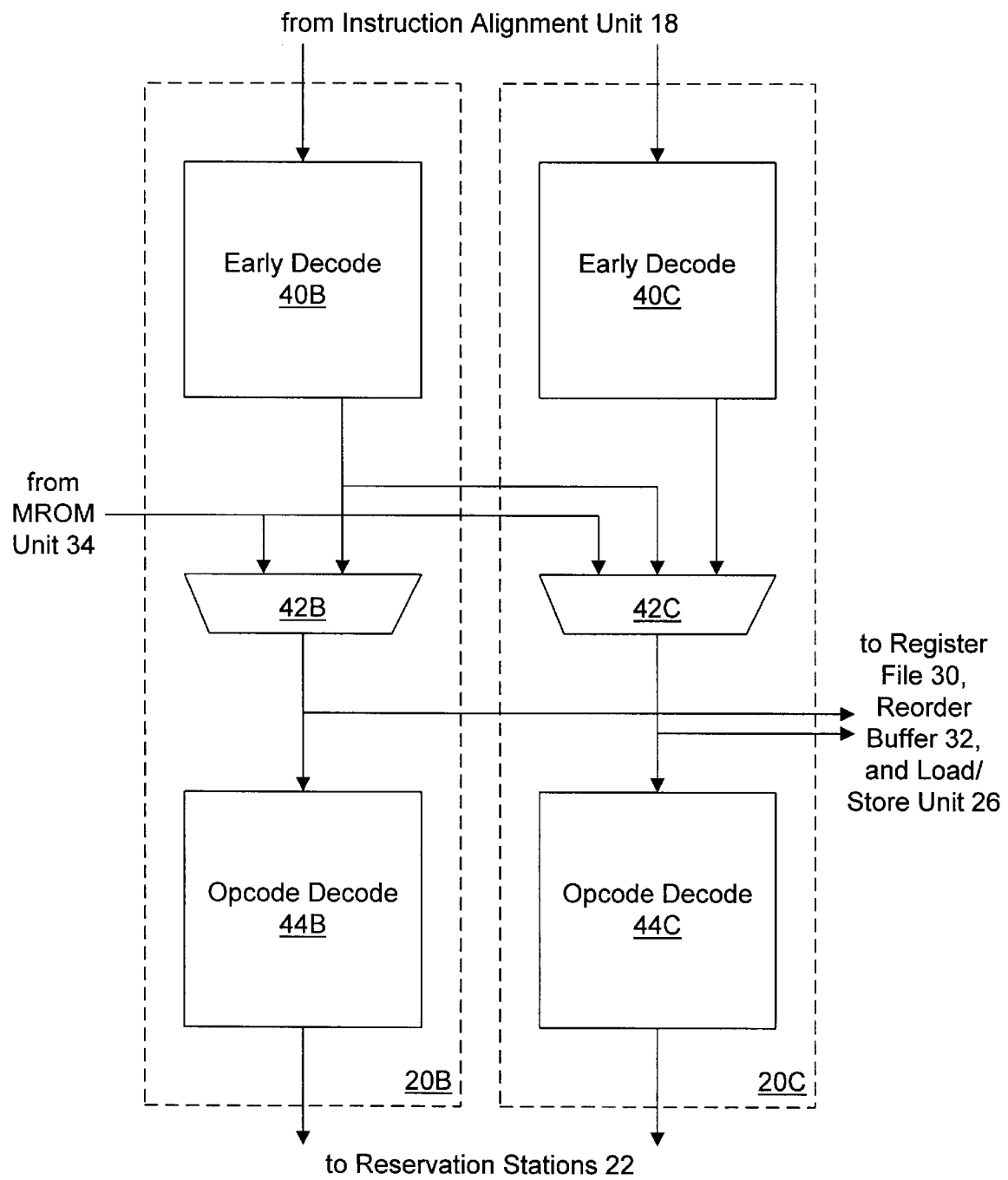
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplex 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 3:
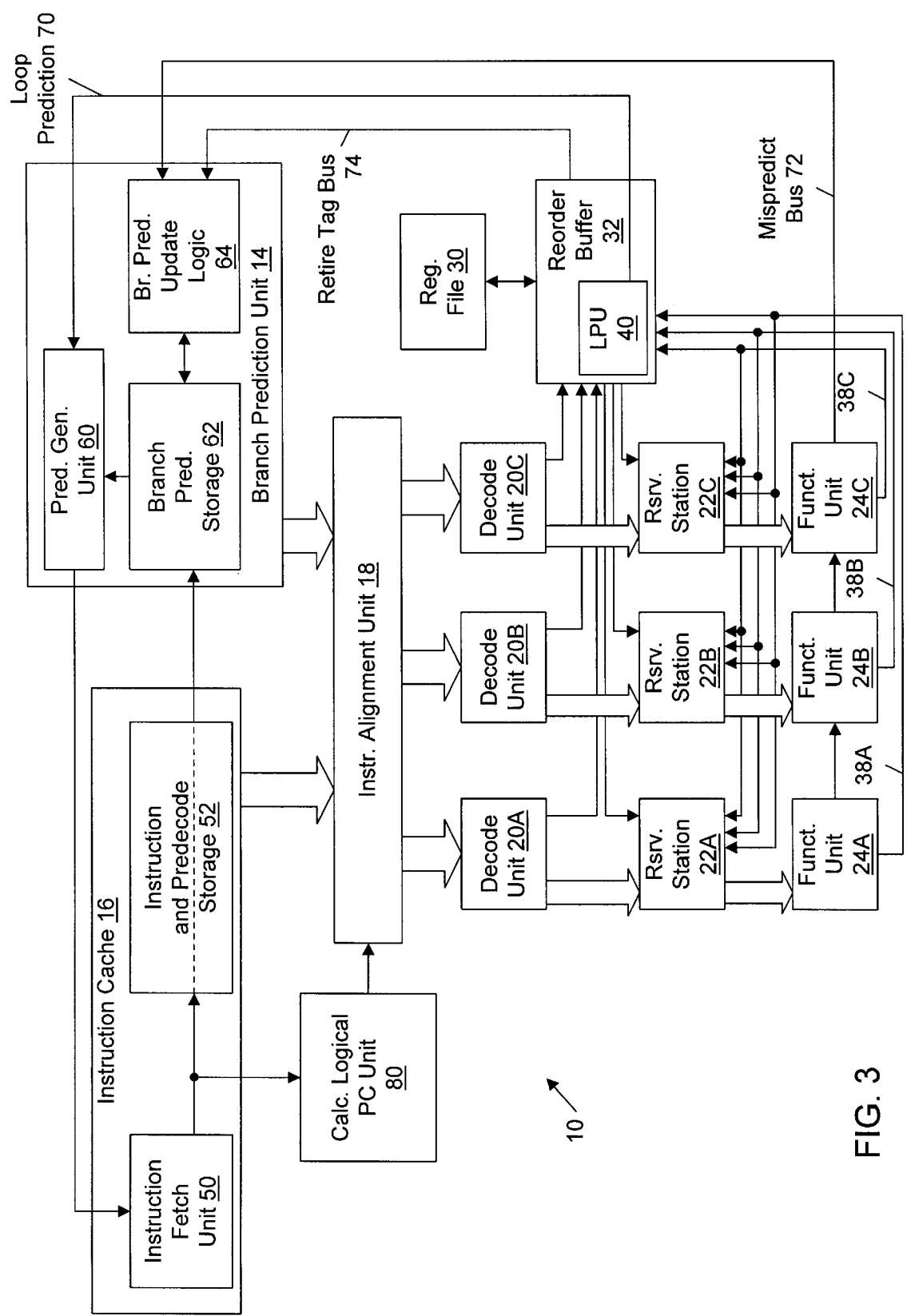
FIG. 3 is a block diagram of one embodiment of portions of microprocessor 10 shown in FIG. 1.

Turning now to FIG. 3, a block diagram depicting portions of microprocessor 10 in greater detail is shown. Blocks corresponding to those in FIG. 1 are numbered identically for simplicity and clarity.

As illustrated, instruction cache 16 includes an instruction fetch unit 50 and an instruction and predecode storage 52, and is coupled to calculate logical PC unit 80, branch prediction unit 14, and instruction alignment unit 18. Branch prediction unit 14 includes a prediction generation unit 60, a branch prediction storage 62, and a branch prediction update logic 64. Branch prediction unit 14 is coupled to instruction cache 16, instruction alignment unit 18, reorder buffer 32, a loop prediction unit 40, and functional units 24A–C. Instruction alignment unit 18 receives inputs from instruction cache 16, branch prediction unit 14, and calculate logical PC Unit 80, and conveys encoded instructions and related information to decode units 20 (in the embodiment shown in FIG. 3, up to three instructions can be conveyed by instruction alignment unit 18 in a given clock cycle). Each of decode units 20 that receives an encoded instruction from instruction alignment unit 18 conveys a decoded instruction to one of reservation stations 22A–C. Operand requests and other instruction information is conveyed to reorder buffer 32, which, in this embodiment, includes a loop prediction unit 40. In response to the operand requests, reorder buffer 32 conveys an operand or tag value to reservation stations 22A–C. Reservation stations 22A–C each convey a decoded instruction and corresponding operands to one of functional units 24A–C, which execute instructions and convey the results to reservation stations 22A–C and reorder buffer 32 on one of result buses 38A–C.

FIG. 3 depicts a high-level block diagram of one embodiment of a loop prediction apparatus. Each clock cycle, instruction and predecode storage 52 conveys a group of contiguous instruction bytes and associated predecode information to instruction alignment unit 18 in response to a fetch address supplied to instruction and predecode storage 52 by instruction fetch unit 50.

As used herein, the term "group of contiguous instruction bytes" is used to refer to the instruction bytes which are provided by the instruction cache in a particular clock cycle in response to a fetch address. A group of contiguous instruction bytes may be a portion of a cache line or an entire cache line, according to various embodiments. When a group of contiguous instruction bytes is a portion of a cache line, it is still an aligned portion of a cache line. For example, if a group of contiguous instruction bytes is half a cache line, it is either the upper half of the cache line or the lower half of the cache line.

The group of contiguous instruction bytes supplied by instruction and predecode storage 52 may contain one or more loop instructions. Since loop instructions are conditional branches (based on the value of the counter register), it is not known until the loop instruction reaches one of functional units 24A–C whether the program will continue execution with the instruction subsequent in memory to the loop instruction (the sequential path) or the instruction located in memory at the target address of the loop instruction (the taken-branch path). In order to increase performance of microprocessor 10, instructions may be speculatively fetched from instruction and predecode storage 52 and forwarded to subsequent pipeline stages, even if a loop instruction is encountered.

Misprediction of branches (including loop instructions) may carry a high clock cycle penalty for recovery since mispredictions are not detected until the instructions reach functional units 24. It is thus desirable to be as accurate as possible in branch prediction techniques. When instruction fetch unit 50 conveys a fetch address to instruction and predecode storage 52 which selects a group of contiguous instruction bytes, the same fetch address is conveyed to branch prediction storage 62, which includes a branch prediction block corresponding to each group of contiguous instruction bytes stored in instruction cache 16. Each branch prediction block includes information which, when conveyed to prediction generation unit 60, may be employed to generate a predicted address for a subsequent access to instruction cache 16.

If the group of contiguous instruction bytes selected from instruction and predecode storage 52 includes conditional branches, these branches are either predicted taken or not-taken in response to information included in the corresponding branch prediction block. If the conditional branch is a loop instruction (indicated in the branch prediction block), the loop instruction is predicted taken unless loop prediction signal 70 is asserted by loop prediction unit 40. In this case, the loop instruction is predicted not-taken. Additionally, a branch prediction block may indicate a sequential execution path (if no branches are present or they are all predicted not-taken) or a return stack execution path corresponding to a subroutine return instruction.

Because branch prediction may be a dynamic process, branch prediction blocks may need to be updated during program execution via branch prediction update logic 64. As branches are dispatched to instruction alignment unit 18, a corresponding branch tag is conveyed along with each branch instruction by branch prediction unit 14. The branch prediction block corresponding to the dispatched branch is conveyed to branch prediction update logic 64 and stored therein along with the corresponding branch tag. The branch tag, when conveyed on mispredict bus 72 or retire tag bus 74, identifies one of the branch prediction blocks stored in branch prediction update logic 64. Mispredict bus 72 is employed by functional units 24A–C when a mispredicted branch is detected, and may be used to update information in the branch prediction block corresponding to the mispredicted branch. Retire tag bus 74 is employed by reorder buffer 32 upon successfully retiring a branch instruction, and may be used to update the branch prediction block to indicate a correctly predicted branch. When branch prediction update logic 64 receives a branch tag and update information, the branch tag is used to select one of branch prediction blocks currently stored therein. When the correct block is chosen and updated, it is written to branch prediction storage 62. In one embodiment, branch prediction storage 62 may include both a read port and a read/write port to allow for simultaneous accesses by instruction cache 16 and branch prediction update logic 64 in the same cycle. Alternatively, branch prediction storage 62 may allow for a delayed update by branch prediction update logic 64 if branch prediction storage 62 is single-ported.

In an alternative embodiment of the loop prediction method described above, each branch prediction block may include an indication of whether a loop instruction should be predicted not-taken. This indication may initially be cleared, signifying that a taken prediction should be selected. Loop prediction unit 40 may update the branch prediction block to indicate a not-taken prediction when signaled via loop prediction signal 70. After predicting the not-taken path, the indication in branch prediction block may be reset.

As described above, a branch instruction is determined to be mispredicted if its actual target address (calculated in functional units 24A–C) differs from its predicted target address (calculated by prediction generation unit 60). Depending on the types of addresses used to represent the actual and predicted target addresses of a branch instruction, the addresses may be converted to a similar format to effectuate branch misprediction detection. In one embodiment of microprocessor 10, the actual target address is a logical address and the predicted target address is a linear address.

Addresses generated by a program are known as logical addresses. When segmentation and paging memory management techniques are employed by microprocessor 10, logical addresses do not directly address the physical memory present in a system. Rather, programs address a virtual model of physical memory. Segmentation facilitates virtual memory management by supporting multiple, independent address regions, or segments. Programs typically operate in a specified segment, and thus use logical addresses, which are offsets into the current segment. Segmentation hardware translates a logical address into a linear address, which indexes into a continuous virtual address space (typically much larger than physical main memory). A linear address can be generated from a logical address by adding the beginning, or base, address of the current segment. Paging techniques are further used to translate linear addresses to physical addresses for accesses to main memory.

According to one embodiment, instruction cache 16 is linearly-addressed. The addresses presented to instruction and predecode storage 52 and those generated by prediction generation unit 60 are therefore linear addresses. Functional units 24 generate logical target addresses for branches, however. When a group of contiguous instruction bytes including a branch is conveyed from instruction cache 16, branch prediction unit predicts a next fetch address that represents an outcome of the branch instruction. This address is presented to the instruction cache during the subsequent clock cycle. Additionally, this address is forwarded to calculate logical PC unit 80. This unit translates a linear address to a logical one by subtracting the base address of the current segment from the linear address presented to instruction and predecode storage 16. This logical address is then conveyed to instruction alignment unit 18 where it is conveyed as an operand of the branch instruction. In this manner, the actual and predicted target addresses may both be compared as logical addresses. Alternatively, functional units 24 may calculate a linear actual target address for comparison to a linear predicted target address.

Instruction alignment unit 18 thus receives a group of contiguous instruction bytes and associated information and attempts to issue instructions to each of decode units 20. In a given clock cycle, the group of contiguous instruction bytes may not include enough valid instructions so that all decode positions are utilized. Each decode unit receives an encoded instruction and its associated predecode information. Additionally, if the instruction is a branch instruction (such as a loop instruction), it receives the branch tag conveyed from branch prediction unit 14 and the logical predicted target address conveyed from calculate logical PC unit 80.

Each of decode units 20 decodes the encoded instruction received from instruction alignment unit 18, and conveys the decoded instruction to its corresponding reservation station 22A–C. The decode units also determine what operands are source and destination operands of their respective instructions, and convey this information to reorder buffer 32. The decode units also convey additional information to reorder buffer 32, such as an indication of whether the decoded instruction is a loop instruction.

As described above, reorder buffer 32 stores speculative register values for facilitating out-of-order execution in microprocessor 10. Decode units 20 therefore request the latest value of the registers used as operands in their respective decoded instructions. As used herein, a "latest" value of a register refers to the most recent update to the register by instructions that have previously been allocated storage in reorder buffer 32. This value may be speculative. If reorder buffer 32 is not currently storing a speculative value for a requested register, it will obtain the value from register file 30 and convey the result to the appropriate reservation station 22. If reorder buffer 32 is storing a speculative result for a requested register, but the result has not yet been calculated, a tag value indicating a particular reorder buffer position (as described with reference to FIG. 1) is conveyed to the appropriate reservation station 22. The appropriate reservation station 22 then monitors the tag values conveyed on result buses 38A–C to obtain the operand value. Finally, if reorder buffer 32 has a speculative calculated result for a requested register, it conveys the result to the appropriate reservation station 22. When a decode unit 20 indicates to reorder buffer 32 that a particular register is a destination operand of a particular instruction, it also conveys a tag indicating a location in reorder buffer 32 to the appropriate reservation station 22. This tag is further conveyed to the corresponding functional unit 24.

Upon detection of a loop instruction during the first iteration of the loop, the latest value of the counter register (speculative or not) is obtained. The latest counter register value is the loop count. Loop prediction unit 40 operates by incrementing a counter for each iteration of a loop and comparing it to the latest counter register value. A loop instruction is signaled to be not-taken on a next loop iteration when the incremented counter is one less than the loop count. This compare is not valid, however, until the latest counter register value is received.

For this reason, loop prediction unit 40 operates in conjunction with reorder buffer 32 to monitor updates to the counter register. In one embodiment, the latest counter register value is stored in a shadow register in loop prediction unit 40 that will be described in further detail below. The shadow register receives information from reorder buffer 32 corresponding to updates to the counter register. During a given clock cycle, the shadow register either contains a data value or a tag indicating that a data value is pending. When loop prediction unit 40 receives an indication of a loop instruction (and loop prediction unit 40 is not already processing that loop), the shadow register is "frozen". Further updates are temporarily disabled, unless the shadow register is awaiting a data value corresponding to a stored tag value, in which case the corresponding data value is allowed to be stored into the shadow register.

In addition to freezing the shadow register upon detecting an initial loop instruction, loop prediction unit 40 increments a counter (previously initialized to zero), thereby indicating one iteration of the loop has been performed. The counter value is then compared to the shadow register value. If the counter value is one less than the shadow register, loop prediction unit 40 signals that the next loop instruction be predicted not-taken by assertion of loop prediction signal 70.

On each successive iteration of the loop, the loop instruction is fetched from instruction cache 16 and conveyed to subsequent pipeline stages. When each loop instruction reaches reorder buffer 32, it causes the counter to be incremented. Another comparison to the frozen shadow register value is performed, and loop prediction signal 70 is asserted if appropriate. If loop prediction signal 70 is asserted, the loop instruction encountered during the final iteration of the loop is predicted not-taken. When this instruction reaches reorder buffer 32, an indication of the loop instruction conveyed to loop prediction unit 40 causes the shadow register to be unfrozen, and the counter value to be reset to zero. Loop prediction unit 40 is thus prepared for the next loop.

Figure 4:
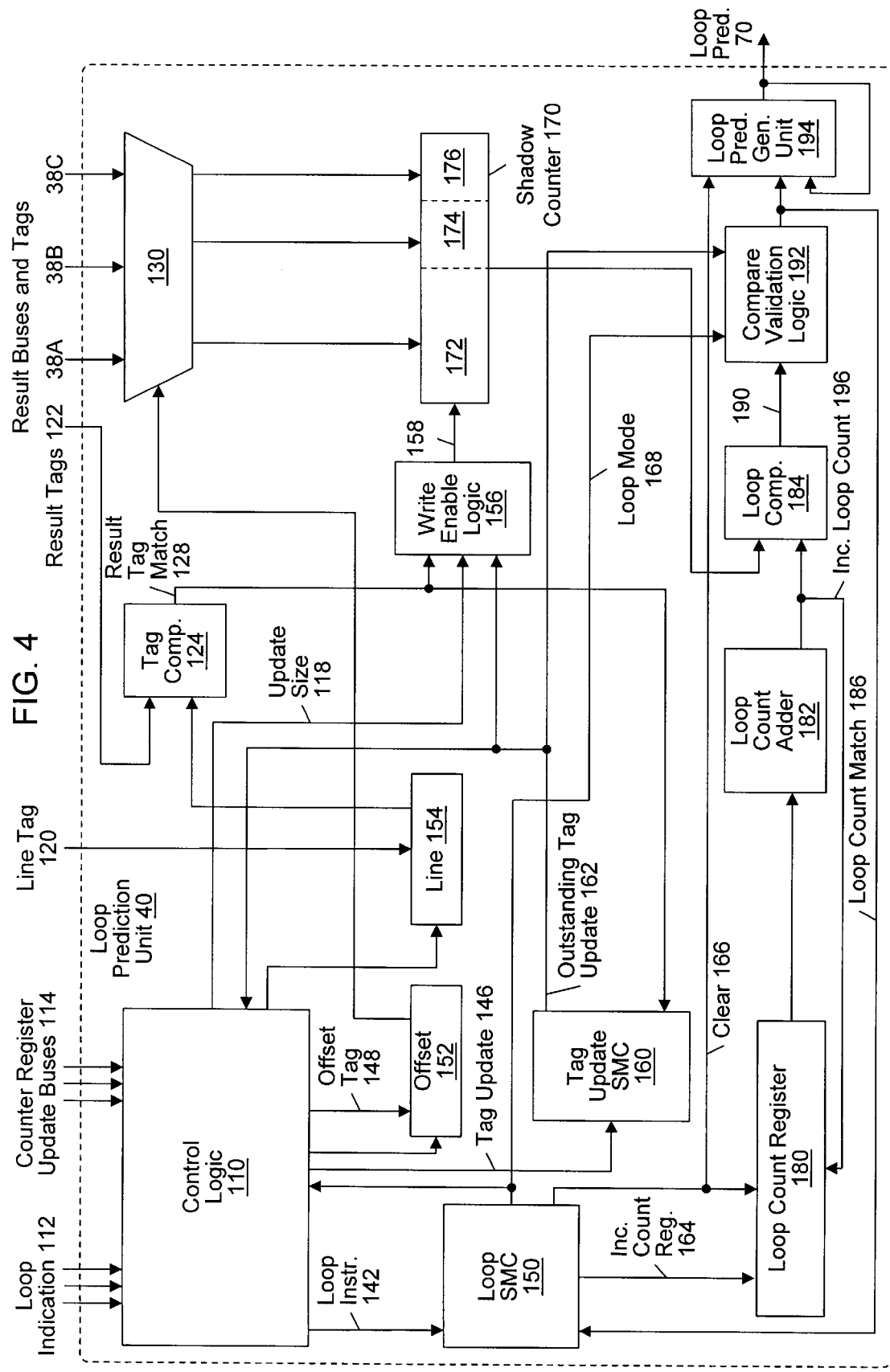
FIG. 4 is a block diagram of one embodiment of a loop prediction unit 40 shown in FIG. 3.

Turning now to FIG. 4, a block diagram of one embodiment of loop prediction unit 40 is depicted. As shown, loop prediction unit 40 includes control logic block 110, which receives a group of loop indication signals 112 and a group of counter register update signals 114 from reorder buffer 32. A loop indication signal 112 and a counter register update bus 114 are received for each issue position in microprocessor 10. Control logic 110 conveys a loop instruction signal 142 to a loop state machine controller 150, and a tag update signal 146 to tag update state machine controller 160. Furthermore, control logic block 110 conveys an offset tag 148 and a corresponding write enable to offset register 152, as well as a write enable to line register 154. Control logic block 110 also drives an update size bus 118 to write enable logic 156.

Tag comparator 124 compares result tags 122 (identifying a line being allocated in reorder buffer 32) and the contents of line register 154, and conveys the result tag match signal 128 to write enable logic 156 and tag update state machine controller 160. The output of offset register 152 selects one of result buses 38A–C, which is then conveyed to shadow counter register 170. Write enable logic 156, which receives an outstanding tag update signal 162 from tag update state machine controller 160 as well as other signals described above, drives a set of write enables 158, one each for regions 172, 174, and 176 within shadow counter register 170.

Loop state machine controller 150 conveys an increment counter register signal 164 and a clear signal 166 to loop count register 180. Loop count register 180 conveys its value to loop count adder 182, which generates an incremented loop count 196 and conveys it to a loop comparator 184. Loop comparator 184 compares shadow counter register 170 and incremented loop count 196 and conveys loop count compare 190 to a compare validation logic block 192, which also receives a loop mode signal 168 and outstanding tag update signal 162. Compare validation logic 192 produces a loop count match signal 186 that is conveyed to loop state machine controller 150 and loop prediction generation unit 194. Loop prediction generation unit 194 produces loop prediction signal 70, which is conveyed to branch prediction unit 14.

Generally speaking, loop prediction unit 40 receives indications of instructions which update the counter register via counter register update buses 114. The corresponding line tag value 120 is stored in line register 154, with the offset tag value (determined by which decode unit indicated the update) being stored in offset register 152. When the result corresponding to the stored tag value is conveyed on result buses 38 (with the tag value conveyed on result tags 122), loop prediction unit 40 stores the result in shadow counter register 170. When loop prediction unit 40 receives indication of a loop instruction (via loop indication signals 112), the value in shadow counter register 170 is frozen. Additionally, loop count register 180 is incremented and compared to the value of shadow counter register 170. Loop count register 180 is incremented and compared to shadow counter register 170 on each subsequent assertion of loop indication signals 112. When the value of loop count register 180 is one less than the value of shadow counter register 170, loop prediction unit 40 asserts loop prediction signal 70, indicating that the loop instruction in the next iteration of the loop should be predicted not-taken. Upon the subsequent loop instruction being detected, loop prediction unit 40 clears loop count register 180 and unfreezes shadow counter register 170.

Decode units 20 convey operand information to reorder buffer 32. In microprocessor 10, reorder buffer 32 employs this operand information to convey loop indication signals 112 and counter register update buses 114 to control logic block 110 within loop prediction unit 40. Reorder buffer 32 receives a signal from each of decode units 20 specifying whether its current instruction is a loop instruction. These signals are used to generate each of loop indication signals 112 to control logic block 110. Similarly, each of decode units 20 conveys operand request information for a given instruction to reorder buffer 32. This information includes the source and destination registers, if any, for the instruction. Reorder buffer 32 employs this information to convey a counter register update bus 114 for each of decode units 20 to control logic block 110. Each counter register update bus 114 includes a valid signal that indicates that the corresponding decode unit has detected an instruction which updates the counter register.

In some embodiments, an instruction may not update the entire counter register. For example, in the x86 instruction set, the counter register, ECX, is 32 bits. This is analogous to the entire shadow counter register 170 shown in FIG. 4, made up of regions 172, 174, and 176. Portions of this x86 ECX register are also addressable as CX, CH, and CL, however. The CX field corresponds to the least significant 16 bits of the counter register (regions 174 and 176). The CX field is further divided into the CH and CL fields: CH (region 174) comprises the 8 most significant bits within CX, while CL (region 176) comprises the 8 least significant bits. Reorder buffer 32 therefore conveys additional signals on each of counter register update buses 114 to indicate which regions within the counter register are being updated by the instruction from the corresponding decode unit 20. In other embodiments of microprocessor 10, the counter register may not be updated in portions, or the number or size of the addressable regions may differ.

If reorder buffer 32 indicates (via counter register update bus 114) an instruction that updates the counter register (and loop indication signals 112 are inactive), control logic block 110 drives various signals to enable storing of this tag value and monitoring of result buses 38 for the corresponding data. If one of counter register update buses 114 is valid, line tag 120 from reorder buffer 32 is also valid. Line tag 120 indicates a line number in a storage location within reorder buffer 32 that the corresponding data value will be stored to upon execution. Control logic block 110 asserts a write enable signal to line register 154 such that line tag 120 is stored therein. The offset within the line can be determined by which decode unit asserted the valid signal on counter register update bus 114. This value is conveyed as offset tag 148 to offset register 152. If more than one decode unit dispatches an instruction which updates the counter register within a given cycle, the offset of the instruction that occurs later in program order in conveyed to offset register 152, and the later line number is conveyed on line tag 120.

Furthermore, control logic block 110 asserts a tag update signal 146 to tag update state machine controller 160. Tag update state machine controller 160 conveys outstanding tag update signal 162 to write enable logic 156 in response to receiving tag update signal 146. Outstanding tag update signal 162 indicates that the latest value of the counter register is not present in shadow counter register 170. Rather, line register 154 and offset register 152 form a tag value for the pending update.

As functional units 24 execute instructions, they convey their results on result bus 38, along with result tags 122 which specifies which line in a storage location within reorder buffer 32 they update. If outstanding tag update signal 162 is asserted, loop prediction unit 40 monitors result buses 38 to capture the data value corresponding to the tag value stored in line register 154 and offset register 152.

As results are conveyed on results buses 38 by functional units 24, the value in offset register 152 selects which result bus is conveyed the inputs of shadow counter register 170. Different portions of the selected result bus are conveyed to different portions of shadow counter register 170 to facilitate partial updating of the counter register, based on the value conveyed on update size bus 118. When outstanding tag update signal 162 is active, write enable logic 156 does not drive write enables 158 unless result tag match 128 is active. This signal is asserted as a result of tag comparator 124 comparing incoming tags on result tag bus 122 with the value conveyed from line register 154. When result tag match signal 128 is asserted, write enable logic 156 drives a write enable signal 158 for each of the regions (172,174, and 176) within shadow counter register 170 that are updated, according to the values conveyed on update size bus 118.

The situation may arise in which control logic block 110 receives an indication of an update to the counter register (which is not a loop instruction) before a previous outstanding tag request has been completed. In such cases, the tag corresponding to the previous counter update is no longer the latest value of the counter register, and is thus not needed. Instead, control logic block 110 drives write enables for offset register 110 and line register 154, such that the new tag is stored therein. Update size bus 118 may be driven with a new value if necessary for the new instruction. Since outstanding tag update signal 162 is still asserted, monitoring of result buses 38 proceeds as before. Tag comparator 124 now uses the updated line number stored in line register 154 to generate result tag match 128.

In one embodiment, shadow counter register 170 may contain fewer bits than the counter register decremented by the loop instruction. In such an embodiment, shadow counter register 170 may not be frozen upon detection of the initial loop instruction. Rather, the results buses will be monitored during loop execution until the value of the counter register "fits" in shadow counter register 170 (meaning that the most significant bits of the counter register which are not stored in the shadow counter register are zero). At this point, shadow counter register 170 is frozen and operation proceeds as described below. This allows loop comparator 184, loop count register 180 and loop count adder 182 to contain a fewer number of bits.

In this manner, loop prediction unit 40 stores the latest value of the counter register that is available to reorder buffer 32. Operation of loop prediction unit 40 continues as described above until one of loop indication signals 112 is asserted. When this occurs, control logic block 110 asserts loop instruction signal 142 to loop state machine controller 150. In response thereto, loop state machine controller 150 conveys loop mode signal 168 and increment count register signal 164. Loop mode signal 168 indicates that microprocessor 10 is executing a loop; this signal is used to qualify output from loop comparator 184 and control logic block 110, as described below. Loop mode signal 168 remains asserted throughout the duration of loop execution.

When loop instruction signal 142 is asserted and loop mode signal 168 is inactive, loop state machine controller 150 asserts loop mode signal 168. When loop state machine controller 150 enters loop mode, loop prediction unit 40 no longer accepts updates to shadow counter register 170 for the duration of loop mode. Because it is no longer updated, shadow counter register 170 is said to be frozen. This is done because the counter value stored by reorder buffer 32 is the loop count that determines how many iterations of the loop will be performed by microprocessor 10. This value is used as a compare value for loop prediction as will be described further below.

When loop mode signal 168 is asserted by loop state machine controller 150, it is conveyed to control logic block 110. When subsequent loop instructions are decoded as the loop iterates, the appropriate one of decode units 20 conveys both an asserted loop indication signal 112 and an asserted counter register update bus 114 (since the loop instruction updates the counter). If loop mode signal 168 is asserted, control logic block 110 causes shadow counter register 170 not to be updated by not asserting write enables 158. If write enables 158 were not disabled, shadow counter register 170 would receive updated results on result bus 38 as the loop instructions performed updates to the counter register. Shadow counter register 170 thus remains a fixed value for the duration of loop execution. When loop mode signal 168 is de-asserted as described below, control logic block 110 resumes updating shadow counter register 170.

According to one embodiment, there are two cases in which shadow counter register 170 may be updated when loop mode signal 168 is asserted. First, when loop mode signal 168 is asserted and a tag update to shadow counter register 170 is still pending, the update to shadow counter register 170 is allowed to complete. The data value corresponding to the tag stored in offset register 152 and line register 154 is needed for comparison purposes to accurately predict subsequent loop outcomes. After shadow counter register 170 receives the tag update, shadow counter register 170 becomes frozen.

The other exception to freezing shadow counter register 170 is upon detection of a non-loop update of the counter register (e.g., a value is moved to the counter register) during loop mode. This is indicated by a valid counter register update bus 114, and a de-asserted loop indication signals 112. In this case, the frozen value in shadow counter register 170 is now incorrect. An update to shadow counter register 170 is thus allowed, with the new value being used for comparison purposes when available. Loop state machine controller 150 remains in loop mode during this update.

Upon hardware reset of microprocessor 10, loop count register 180 is cleared to zero. This zero value is conveyed to loop count adder 182, where it is incremented and conveyed back to loop count register 180. The value (one, at this point) remains in loop count register 180 until a loop is encountered and loop state machine controller asserts increment count register signal 164 in response to receiving loop instruction signal 142. When increment count register 164 is received, the value of loop count register 180 is conveyed through loop count adder 182 back to loop count register 180 as incremented loop count 196. Incremented loop count 196 is also conveyed to loop comparator 184, where it is compared to the output of shadow counter register 170. This process continues as loop instructions are encountered in subsequent iterations of the loop. Loop count register 180 may be reset by asserting clear signal 166.

Loop prediction unit 40 predicts a loop instruction as being taken after every iteration of the loop except the last. Therefore, when the value in loop count register 180 is one less than the value in shadow counter register 170 (indicating that one iteration of the loop remains), the next iteration of the loop should be predicted not-taken. To perform this comparison, the value of loop count register 180 plus one may be compared to the value of shadow counter register 170. Incremented loop count 196, the output of loop count adder 182, may be employed for this purpose. Loop comparator 184 thus compares the value of shadow counter register 170 to incremented loop count 196, and conveys loop count compare signal 190 to compare validation logic block 192. Compare validation logic block 192 asserts loop count match 186 if the results of loop comparator 184 are determined to be valid. The results of loop comparator 184 are deemed valid if loop mode signal 168 is asserted and outstanding tag update signal 162 is not asserted. Loop mode signal 168 indicates a loop is in progress, and de-assertion of outstanding tag update signal 162 indicates that shadow counter register 170 contains valid data.

In one embodiment, loop count match signal 186 is only valid during one iteration of a loop, at most. If shadow counter register 170 does not have a valid data value (because it is still awaiting a tag update) when incremented loop count 196 matches what will be the eventual counter value, loop count match 186 will never be valid for the loop. In this case, the final loop instruction will be mispredicted, since loop instructions are always predicted taken in microprocessor 10 unless overridden by loop prediction signal 70. In this case, a branch misprediction signal (not shown) may be asserted in response to the loop instruction executed in the final iteration of the loop. This branch misprediction signal may be used to reset loop state machine controller 150, causing de-assertion of loop mode signal 168 and assertion of clear signal 166.

When loop count compare 190 is determined valid, compare validation logic block 192 conveys loop count match 186 to both loop prediction generation unit 194 and loop state machine controller 150. When loop prediction generation unit 194 receives loop count compare 184, it asserts loop prediction signal 70 to branch prediction unit 14. As will be described below, branch prediction unit 14 predicts the next loop instruction to be not-taken in response to loop prediction signal 70.

When loop state machine controller 150 detects an assertion of loop count match 186 by compare validation logic 192, it indicates that the next loop indication signal 112 signifies the predicted termination of the loop. The next assertion of loop instruction signal 142 after an assertion of loop count match 186 causes clear signal 166 to be conveyed to loop count register 180 and loop prediction generation unit 194. Clear signal 166 causes loop count register 180 to be reset to a zero value and loop prediction signal 70 to be de-asserted. Additionally, loop mode signal 168 is also de-asserted upon receiving indication of the predicted final loop value via loop instruction signal 142. Loop mode signal 168 is conveyed to control logic block 110, thus indicating that loop prediction unit 40 should resume updating shadow counter register 170. With loop mode signal 168 not asserted, control logic block 110 will again allow updates to shadow counter register 170 by activating write enables 158 upon receiving valid signals on counter register update buses 114. As before, updates are accepted until another loop instruction is encountered.

In some instances, this loop prediction mechanism may mispredict. Consider a case in which shadow counter register 170 is awaiting an update on one of result buses 38 corresponding to the tag value specified by line register 154 and offset register 152. A loop instruction is decoded by one of decode units 20, and the corresponding loop indication 112 is conveyed to loop prediction 40. This indication is signaled to loop state machine controller 150 via loop instruction signal 142, causing loop mode signal 168 to be asserted. This freezes updates to shadow counter register 170, although the data value corresponding to the stored tag is allowed to update shadow counter register 170 when it becomes available. While this update is pending, control logic block 110 continues to receive valid loop indication signals 112 as loop instructions are encountered during subsequent iterations of the loop. This causes loop count register 180 to increment as described above. While outstanding tag update signal 162 is active, however, a valid compare (loop count match signal 186) cannot occur between incremented loop count 196 and shadow counter register 170. If, during a given clock cycle, shadow counter register 170 does not have a valid data value when incremented loop count signal 196 equals what will be the eventual value of shadow counter register 170, loop prediction signal 70 will not be asserted to cause the next loop instruction to be correctly predicted as not-taken. The next loop instruction will again be predicted taken, and the misprediction will be detected when this instruction executes in one of functional units 24.

As described above, branch mispredictions detected by functional units 24 convey misprediction results to branch prediction unit 14 via mispredict bus 72. Although not shown in FIG. 4, mispredictions (and other exceptions) are also signaled to reorder buffer 32 and loop prediction unit 40 for state recovery. Upon detecting an exception condition, reorder buffer discards all speculative register results for instructions prior to the one that caused the exception condition. This involves a process of re-dispatching instructions internally within reorder buffer 32 to calculate the correct architectural state for exception recovery. The restored value of the counter register is then conveyed to loop prediction unit 40.

Figure 5:
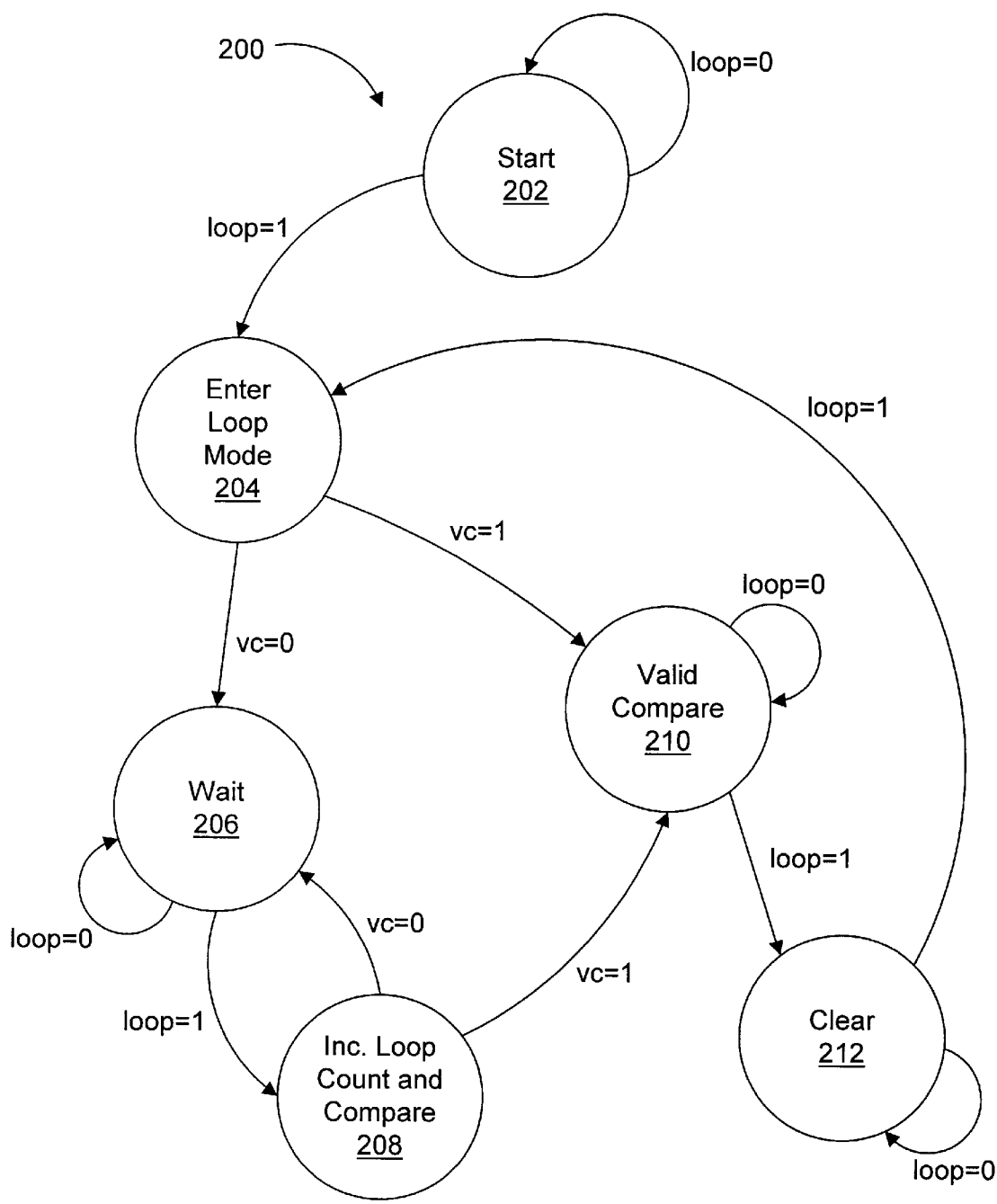
FIG. 5 is a depiction of operation of one embodiment of loop state machine controller 150 shown in FIG. 4.

Turning now to FIG. 5, a loop state machine 200 depicting operation of loop state machine controller 150 is shown. State machine 200 includes a start state 202, a enter loop mode state 204, a wait state 206, a increment loop and compare state 208, a valid compare state 210, and a clear state 212. Transitions in FIG. 5 are labeled with "loop" and "vc". The "loop" label corresponds to the value of loop instruction signal 142, while "vc" (valid compare) corresponds to the value of loop count match signal 186.

State machine 200 remains in start state 202 until loop instruction signal 142 is asserted. This causes state machine 200 to transition to enter loop mode state 204. In this state, loop state machine controller 150 asserts loop mode signal 168 and increment count register signal 166. A compare of incremented loop count 196 and shadow counter register 170 is then performed. If the compare is a valid, loop count match signal 186 is asserted, causing state machine 200 to transition to valid compare state 210. If the compare is not a valid match, state machine 200 enters wait state 206. It remains in state 206 until loop instruction signal 142 is asserted. This causes state machine 200 to enter increment loop count and compare state 208. In this state, loop state machine controller 150 asserts increment count register signal 166. A compare is performed as described above, and state machine 200 transitions to state 206 or 210 depending on the result of the compare. When state machine 200 enters valid compare state 210, it remains there until loop instruction signal 142 is asserted. This causes state machine 200 to enter clear state 212. Upon entering clear state 212, loop state machine controller asserts clear signal 166 and de-asserts loop mode signal 168. State machine 200 remains in clear state 212 until loop indication signal 142 is asserted, causing a transition to enter loop mode state 204.

Figure 6:
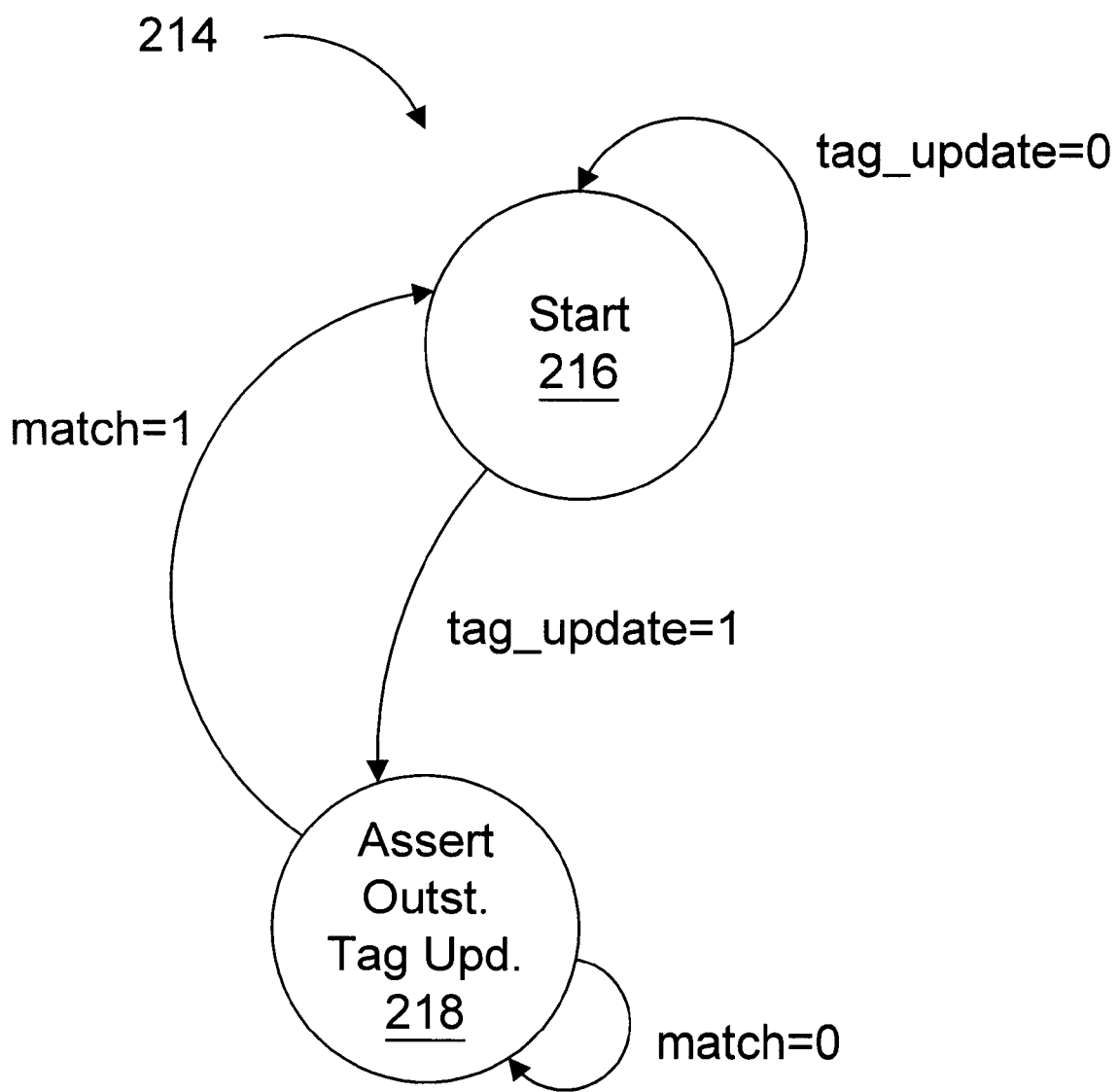
FIG. 6 is a depiction of operation of one embodiment of tag update state machine controller 160 shown in FIG. 4.

Turning now to FIG. 6, a state machine 214 depicting operation of tag update state machine controller 160 is shown. State machine 214 includes a start state 216 and a assert outstanding tag update state 218. Transitions in FIG. 6 are labeled with "tag_update" and "match". The "tag_update" label corresponds to the value of tag update signal 146, while "match" corresponds to result tag match signal 128.

State machine 214 remains in start state 216 until tag update signal 146 is asserted by control logic block 110. This cause state machine 214 to transition to assert outstanding tag update state 218. When state machine 214 is in state 218, tag update state machine controller 160 asserts outstanding tag update signal 162, indicating that an update corresponding to the tag value stored in line register 154 and offset register 152 is pending. State machine 214 remains in state 218 until either result tag match 218 is asserted by tag comparator 124 or tag update signal 146 is asserted again by control logic block 110. An assertion of result tag match 128 indicates that the corresponding to the tag value stored in line register 154 and offset register 152 has completed and the data in shadow counter register 170 is now valid.

Figure 7:
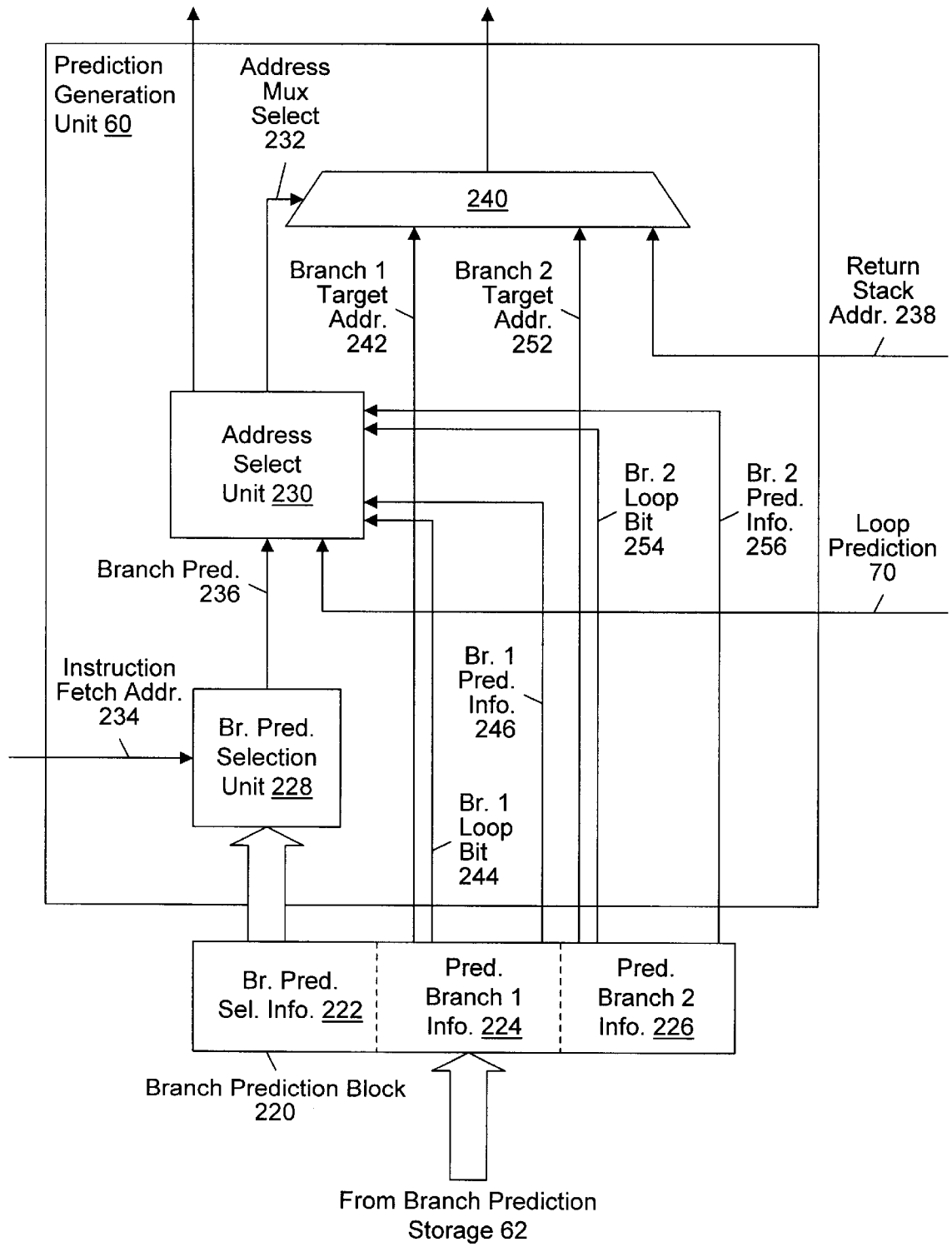
FIG. 7 is a block diagram of one embodiment of a portion of a branch prediction unit.

Turning now to FIG. 7, a block diagram of one embodiment of a portion of branch prediction unit 14 is shown. As depicted, prediction generation unit 60 includes a branch prediction selection unit 228, an address select unit 230, and a next instruction fetch address multiplexer 240. Prediction generation unit 60 receives a branch prediction block 220 from branch prediction storage 62 as input. Branch prediction block 220 includes a branch prediction selection information field 222, a predicted branch 1 information field 224, and a predicted branch 2 information field 226. Branch prediction selection information field 222 is conveyed to branch prediction selection unit 228, which also receives an instruction fetch address 234. In response, branch prediction selection unit 228 conveys a branch prediction 236 to address select unit 230, which also receives loop prediction signal 70 from loop prediction unit 40. Furthermore, a branch 1 loop bit 244 and a branch 1 prediction information signal 246 are conveyed to address select unit 230 from predicted branch 1 information field 224 in branch prediction block 220. Likewise, a branch 2 loop bit 254 and a branch 2 prediction information signal 256 are also conveyed to address select unit 230 from predicted branch 2 information field 226 in branch prediction block 220. Address select 230 conveys a address multiplexer select signal 232 to next instruction fetch address multiplexer 240, and a sequential fetch signal 258 to instruction fetch unit 50. Next instruction fetch address multiplexer 240 receives a branch 1 target address 242 from predicted branch 1 information field 224 in prediction block 220, as well as a branch 2 target address 252 from prediction branch 2 information field 226. Additionally, next instruction fetch address multiplexer 240 receives a return stack address 238 from a return stack unit (not shown). Next instruction fetch address multiplexer 240 employs address multiplexer select signal 232 to select from among the aforementioned inputs to convey next instruction fetch address 260 to instruction fetch unit 50.

Prediction generation unit 60 generates a predicted next instruction fetch address 260 to instruction cache 16 in response to current address instruction fetch address 234, return stack address 238, loop prediction signal 70, and information contained within a selected branch prediction block. When instruction fetch unit 50 presents an address to instruction and predecode storage 52 (thus selecting a group of contiguous instruction bytes and corresponding predecode information), this same address, instruction fetch address 234, is also conveyed to branch prediction storage 62 and prediction generation unit 60. Instruction fetch address 234 selects a branch prediction block within branch prediction storage 62 that corresponds to the group of contiguous instruction bytes and predecode information selected from instruction and predecode storage 52.

Branch prediction storage 62 conveys the selected branch prediction block (represented in FIG. 5 as branch prediction block 220) to prediction generation unit 60. Different portions of branch prediction block 220 are routed to various units within prediction generation unit 60. Information within branch prediction selection information field 222 is conveyed to branch prediction selection unit 228. Additionally, information within predicted branch 1 information field 224 and predicted branch 2 information field 226 is conveyed to both address select unit 230 and next instruction fetch address multiplexer 240.

Prediction generation unit 60 selects next instruction fetch address 260 from among several possible values for conveyance to instruction fetch unit 50. In the embodiment shown in FIG. 5, prediction generation unit 60 selects from a sequential execution path, a first predicted branch path, a second predicted branch path, and a return stack path. In other embodiments, a different number of prediction options may be available.

The information in branch prediction selection information field 222 is used to select which one of these possible execution paths will be conveyed to instruction cache 16 for use in the next clock cycle. In one embodiment, this determination may be made by the offset of instruction fetch address 234 within the current group of contiguous instruction bytes. In another embodiment, branch prediction selection information field 222 may include a branch selector for each byte corresponding to the current group of contiguous instruction bytes. Each branch selector includes an encoding specifying which of the possible addresses should be selected for next instruction fetch address 260. This information may be calculated by prefetch/predecode unit 12 that may be configured to detect conditional branches and subroutine return instructions upon storing instructions into instruction cache 16 from main memory. For example, consider a group of contiguous instruction bytes that includes the byte addressed by instruction fetch address 234. If upon storage to instruction cache 16, prefetch/predecode unit 12 detected no control flow changes (i.e., branch instructions) in the remainder of the instruction bytes in the current group, the branch selector for instruction fetch address byte may therefore indicate to predict a sequential path for the next access to instruction cache 16. Alternately, if prefetch/predecode unit 12 detected a predicted-taken branch subsequent to instruction fetch address 234 and this branch is represented by information in predicted branch 1 information field 224, the branch selector for instruction fetch address 234 would indicate to predict branch 1 target address as next instruction fetch address 260. Many other embodiments for branch prediction selection information 222 and branch prediction selection unit 228 are also possible.

Based upon instruction fetch address 234, branch prediction selection unit 228 conveys a branch prediction 236 to address select unit 230. Address select unit 230 receives additional information to determine if this prediction should be conveyed to next instruction fetch address multiplexer 240. If branch prediction 236 indicates a sequential prediction, address select unit 230 asserts sequential fetch signal 258 and does not select an address from next instruction fetch address multiplexer 240. In one embodiment, if instruction fetch unit 50 receives an indication of a predicted sequential path, it can calculate the next sequential address from the previous address. In other embodiments, a predicted sequential address may be calculated in prediction generation unit 60 and selected at multiplexer 240 if predicted by branch prediction selection unit 228. In such embodiments, sequential fetch signal 258 would not be used.

Furthermore, if branch prediction 236 indicates a first predicted branch, address select unit 230 uses additional signals to qualify this prediction. Branch 1 prediction information field 246 may include historical branch data. Based on this information, address select unit 230 may elect to predict the branch not-taken, and thus select a sequential execution path as described above. If branch 1 loop bit 244 is set for the branch, this indicates the branch is a loop instruction. In this case, address select unit will predict this branch to be taken unless loop prediction signal 70 is asserted as described above. If address select unit 230 determines that the branch corresponding to predicted branch 1 information field 224 is to be predicted taken, branch 1 target address 242 is selected at next instruction fetch address multiplexer 240 by address multiplexer select 232. Branch 1 target address 242 is thus conveyed as next instruction fetch address 260 to instruction fetch unit 60.

If branch prediction 236 indicates a second predicted branch, address select unit 230 operates similarly to the case of a first predicted branch described above. The second branch, corresponding to predicted branch 2 information 226, is predicted taken unless 1) a loop is indicated by branch 2 loop bit 254 and loop prediction signal 70 is asserted or 2) branch 2 prediction information 256 includes data which indicates the branch should be predicted not-taken. If the branch is predicted not-taken, sequential fetch signal 258 is asserted to instruction fetch unit 50; otherwise, branch 2 target address 252 is conveyed to instruction fetch unit 50, being selected by address multiplexer select 232 at next instruction fetch address 240.

The return stack unit (not shown) is used to store return addresses corresponding to subroutine call instructions previously fetched by microprocessor 10. In one embodiment, the branch predictions stored by branch prediction storage 62 include an indication that the branch prediction corresponds to a subroutine call instruction. Subroutine call instructions are a subset of branch instructions which save the address of the sequential instruction (the return address) in addition to redirecting the instruction stream to the target address of the subroutine call instruction. For example, the in the x86 microprocessor architecture, the subroutine call instruction (CALL) pushes the return address onto the stack indicated by the ESP register.

A subroutine return instruction is another subset of the branch instructions. The subroutine return instruction uses the return address saved by the most recently executed subroutine call instruction as a target address. Therefore, when a branch prediction includes an indication that the branch prediction corresponds to a subroutine call instruction, the sequential address to the subroutine call instruction is placed at the top of the return stack. When a subroutine return instruction is encountered (as indicted by a particular branch selector encoding), the address nearest the top of the return stack which has not previously been used as a prediction is used as the prediction of the address.

When branch prediction 236 indicates a prediction from the return stack path, the address nearest the top of the return stack which has not previously been used as a prediction is conveyed by the return stack upon return stack address 238. This address is selected by address multiplexer select signal 232 at next instruction fetch address multiplexer 240, and conveyed as next instruction fetch address 260. Branch prediction unit 14 informs the return stack when the return address is selected as the prediction.

Figure 8:
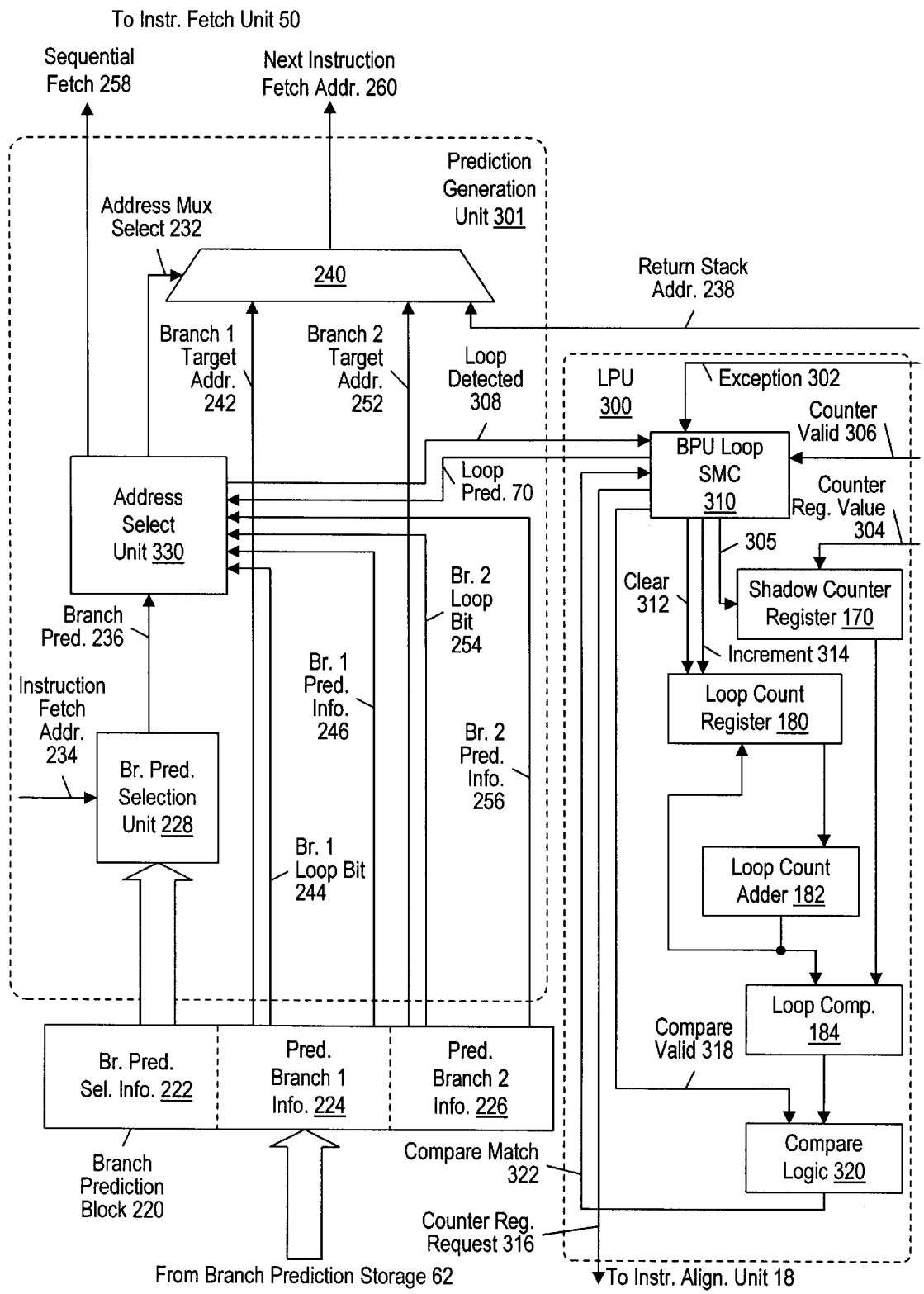
FIG. 8 is a block diagram of a one embodiment of a loop prediction unit implemented within a branch prediction unit.

Turning now to FIG. 8, a block diagram of one embodiment of a loop prediction unit, loop prediction unit 300, is shown. Loop prediction unit 300 operates similarly to loop prediction unit 40 depicted in FIGS. 3–5. Loop prediction unit 40 is implemented within reorder buffer 32, whereas loop prediction unit 300 is implemented within branch prediction unit 14. Logic blocks in FIG. 8 that perform the same functionality as the logic blocks in FIGS. 4 and 5 are numbered identically for simplicity.

As illustrated, prediction generation unit 301 is similar to the one shown in FIG. 7, with the addition of a new address select unit 330. Address select unit 330 has the additional functionality of conveying a loop detected signal 308 to loop prediction unit 300, and receiving loop prediction signal 70. Loop prediction unit 300 includes a branch prediction unit loop state machine controller 310 (BPU loop state machine controller 310), and a compare logic block 320. Loop prediction unit 300 also includes shadow counter register 170, loop count register 180, loop count adder 182, and loop comparator 184. BPU loop state machine controller 310 receives an exception signal input 302, a counter register value bus 304, and a counter valid signal 306 from reorder buffer 32. BPU loop state machine controller 310 also receives loop detected signal 308, as well as a compare match signal 322 from compare logic block 320. BPU loop state machine controller 310 conveys an increment signal 314, a clear signal 312, a compare valid signal 318, a counter register write enable 305, and a counter register request signal 316.

One impediment to accurate loop prediction is small loop size. The size of a loop is the number of instructions performed in each iteration of the loop. As used herein, "small", when referring to loop size, is relative to the number of instructions being processed in the pipeline stages that are located between loop count compare and branch prediction. If the number of instructions in a single iteration of a loop is less than the number of instructions in these pipeline stages, the loop is considered "small". Small loops may be problematic in some implementations of loop prediction units.

Consider loop prediction unit 40 depicted in FIGS. 3–4. When a valid compare between incremented loop count 196 and shadow counter register 170 is detected, loop prediction signal 70 is conveyed to prediction generation unit 62, indicating that the next loop instruction should be predicted as being not-taken. However, the number of pipeline stages between allocation in the reorder buffer (and, correspondingly, loop count checking in loop prediction unit 40) and branch prediction generation may be greater than the number of instructions in the loop. If this is the case, the subsequent loop instruction (the one that should be predicted not-taken) may have already proceeded past branch prediction in the pipeline. Loop prediction signal 70 will arrive too late to branch prediction unit 14, thus causing the last loop instruction to be incorrectly predicted. The problem of having multiple loop instructions in the pipeline concurrently becomes more likely as microprocessor pipeline length increases.

The effect of small loop size on branch prediction accuracy may be decreased by implementation of the loop prediction unit at the point of branch prediction, as shown in FIG. 8. In this manner, the branch prediction mechanism has knowledge of the result of the most recent loop count compare and can evaluate the results before subsequent branch predictions are made.

Prediction generation unit 301 operates substantially as described with reference to FIG. 7. Branch prediction information is conveyed to prediction generation unit 60 from branch prediction storage 62 via a branch prediction block, represented in FIG. 8 as branch prediction block 220. Branch prediction selection unit 228 selects one of the branch predictions from branch prediction selection information field 222 in response to an instruction fetch address 234. Branch prediction 236 is conveyed to address select unit 330, which also receives information relating to up to two predicted branches. (In other embodiments, the number of branches available for selection may differ). Based on branch prediction 236, prediction information related to the two branches, and whether the predicted branch is a loop, address select unit 330 conveys address multiplexer select 232 to multiplexer 240, and sequential fetch 258 to instruction fetch unit 50 if a sequential prediction path is selected.

The output of multiplexer 240 is conveyed as next instruction fetch address 260 to instruction fetch unit 50.

When address select unit 330 predicts a taken branch instruction that is a loop instruction (indicated via branch 1 loop bit 244 or branch 2 loop bit 254), loop detected signal 308 is conveyed to BPU loop state machine controller 310. If the loop prediction unit 300 is not in loop mode (an internal state of BPU state machine controller 310), counter register request signal 316 is asserted to instruction alignment unit 18. This signal is conveyed with the loop instruction and its associated predecode information through subsequent pipeline states. When this instruction reaches the pipeline stage where it is allocated a storage location in reorder buffer 32, it also includes a signal indicating that the latest value of the counter register is requested by loop prediction unit 300. This is done via counter register value bus 304 and assertion of its valid signal, counter valid signal 306. When counter valid signal 306 is conveyed to BPU loop state machine controller 310, counter register write enable 305 is asserted, causing the data on counter register value bus 304 to be written to shadow counter register 170. Counter valid signal 306 also updates the state machine in BPU loop state machine controller 310, causing assertion of compare valid signal 318.

Another effect of assertion of loop detected signal 308 is that loop count register 180 is incremented. This is performed by BPU loop state machine controller 310 conveying increment signal 314 to loop count register 180. This causes the value in loop count register 180 to be conveyed to loop count adder 182 and conveyed back to loop count register 180. The output of loop count adder 182 is also conveyed to loop comparator 184.

Loop comparator 184 compares the output of loop count adder 182 and shadow counter register 170 and conveys the result to compare logic block 320. If compare logic block 320 receives compare valid signal 318, the output of loop comparator 184 is considered valid. Compare logic block 320 thus conveys compare match signal 322 to BPU loop state machine controller 310, which then asserts loop prediction signal 70 to address select unit 330. Loop prediction signal 70 will remain asserted until the next loop instruction is received by prediction generation unit 360. Address select unit 330 will predict this next loop as not-taken in response to assertion of loop prediction signal 70. Address select unit will also assert loop detected signal 308 to BPU loop state machine controller 310, an indication that loop prediction signal 70 has been received by address select unit 330. This causes loop prediction signal 70 to be de-asserted and clear signal 312 to be asserted, clearing loop count register 180. At this point loop prediction unit is now ready to begin processing of the next loop.

Note that in another embodiment, loop prediction unit 40 (pictured in FIG. 4) may include additional hardware to also decrease the effect of small loop size on accurate loop prediction. This may be accomplished by varying the amount of difference between loop count register 180 and shadow counter register 170 which causes assertion of loop prediction signal 70. As described with reference to FIG. 4, loop prediction signal 70 is asserted when loop count register 180 is one less than shadow counter register 170. If the loop size is smaller than the number of instructions which may be in the pipeline stages between branch prediction unit 14 and reorder buffer 32, however, the final loop instruction may be predicted incorrectly.

In such an embodiment, control logic block 110 may count the number of instructions between successive assertions of one of loop indication signals 112. If this number is less than some predetermined minimum, control logic block 110 may assert additional signals (not shown in FIG. 4) to loop count adder 182. Also in this embodiment, loop count adder 182 is configured to add one to the value received from loop count register 180 for conveyance back to register 180, but also to add a value received from control logic block 110 and convey this value to loop comparator 184. In this manner, an "n-less" compare may be effected.

Figure 9:
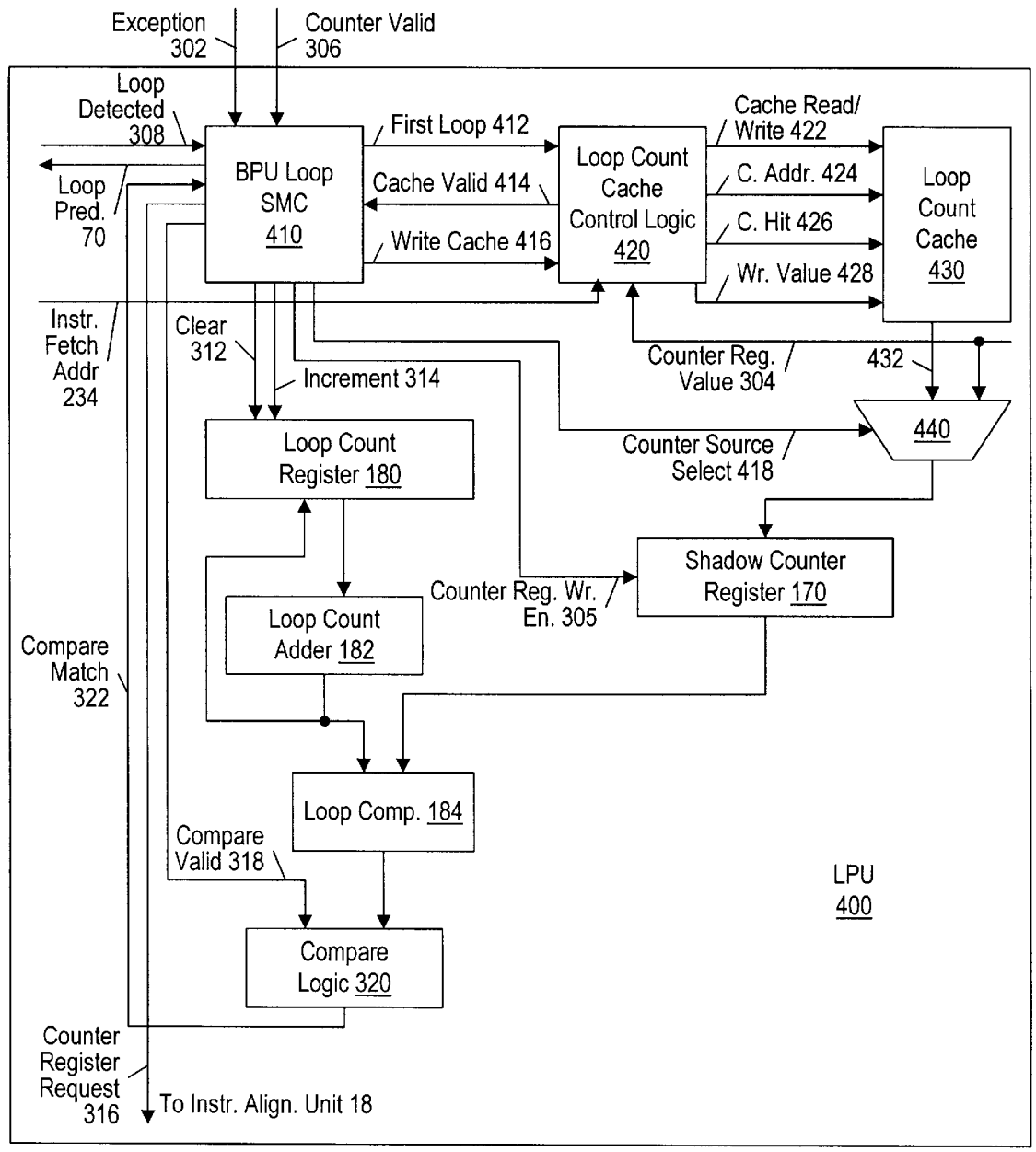
FIG. 9 is a block diagram of a one embodiment of a loop prediction unit employing a loop count cache.

Turning now to FIG. 9, a block diagram of a loop prediction unit 400 which includes a loop count cache 430 is shown. Logic blocks which are similar in function to those depicted in FIG. 8 are numbered identically.

As illustrated, loop prediction unit 400 includes a BPU loop state machine controller 410, which is similar to state machine controller 310 shown in FIG. 8. BPU loop state machine controller 410 additionally conveys a first loop signal 412, a write cache signal 416, a counter source select signal 418, and receives a cache valid signal 414. Loop count cache control logic 420 receives first loop signal 412, write cache signal 416, in addition to instruction fetch address 234 and counter register value bus 304. Loop count cache control logic 420 conveys a cache read/write signal 422, a cache address 424, a cache hit signal 426, and a write value bus 428 to loop count cache 430, which conveys cache loop count value 432 to counter source multiplexer 440. Similar to loop prediction unit 300, loop prediction unit 400 includes loop count register 180, loop count adder 182, loop comparator 184, and compare logic block 320.

As described above, implementing a loop prediction unit in the branch prediction unit lessens loop mispredictions due to small loop size. Another obstacle to accurate loop prediction is a short loop predict length. As used herein, "loop predict length" is the total number of clock cycles taken to execute from the beginning of the loop to just prior to the beginning of the last iteration of the loop. At this point, the compare of loop count adder 182 output and shadow counter register 170 must be valid to predict the last iteration of the loop correctly. For this compare to be valid, the value of shadow counter register 170 must be returned from reorder buffer 32 with a valid value. If this does not occur before the commencement of the last iteration of the loop, the loop is considered herein to have a "short" loop predict length.

Since loop predict length is a function of how many instructions execute before the last iteration of the loop begins, the loop predict length is most likely to cause a misprediction if the loop is executed a small number of times (small loop count) and has sufficiently few instructions. Note that a loop may have a small loop count, but may be sufficiently long to allow the counter register value to be retrieved from reorder buffer 32. Loop misprediction due to short loop predict lengths may occur for loop prediction units implemented both in reorder buffer 32 and branch prediction unit 14.

The problem of loop misprediction due to short loop predict lengths is lessened through the use of a cache designed to hold loop count values. One embodiment of such a cache is depicted in FIG. 9 as loop count cache 430, implemented within loop prediction unit 400. The purpose of loop count cache 430 is to allow quick retrieval of counter register values employed in past executions of a given loop instruction. If the loop count remains constant from one execution of a loop to the next, loop count cache 430 may decrease the number of loops mispredicted due to short loop predict lengths.

Because quick retrieval of counter register values is more important for loops with short loop predict lengths (generally corresponding to small loop counts), loop count cache 430 may only include loops with loop counts under a predetermined amount. If a loop has a large loop count, it is likely it will not mispredict due to the counter register value not being returned in time. Instead, the counter register value may be requested as described above. If a loop has a small loop count, however, it may be advantageous to store its loop count in loop count cache 430 for future reference.

A branch prediction unit is not shown in FIG. 9 since the interface is similar to that shown in FIGS. 7 and 8. As described above, an indication of a loop instruction is conveyed to BPU loop state machine controller 410 via loop detected signal 308. Controller 410 is similar to controller 310 shown in FIG. 6, but has slightly different functionality due to inclusion of loop count cache 430. If BPU loop state machine controller 410 is not currently servicing a loop (determined by an internal state of the loop state machine), first loop signal 412 is conveyed to loop count cache control logic 420, along with instruction fetch address 234.

In one embodiment, loop count cache 430 includes a tag portion for detecting a hit or miss, and a value corresponding to the loop count value of a previous execution of the loop. In one embodiment, loop count cache control logic 420 includes replacement information for selecting a particular location within loop count cache 430 for replacement if loop count cache 430 is full.

In one embodiment, a loop instruction is identified in loop count cache 430 by using a number of high-order address bits from instruction fetch address 234. In one embodiment, the number of address bits used may be the number sufficient to uniquely identify the group of contiguous instruction bytes selected by presenting instruction fetch address 234 to instruction and predecode storage 52. (For example, if instruction fetch address 234 were a 32-bit value which selected a 16-byte group of contiguous instruction bytes from instruction cache 16, the size of the address presented to loop count cache 430 would be 28 bits).

In such an implementation, multiple loop instructions within a group of contiguous instruction bytes within instruction cache 16 may map to the same loop count cache address and yield incorrect loop count values. In a different embodiment, an offset of the predicted loop instruction within the group of contiguous instruction bytes may also be supplied by branch prediction unit 14. The offset may then be combined with instruction fetch address 234 to form the full address of the loop instruction for which a loop count is desired. In this manner, each loop instruction in a given group of contiguous instruction bytes may be addressed separately.

The number of address bits conveyed on cache address 424 may depend upon the implementation of loop count cache 430. Loop count cache 430 may be implemented as a direct-mapped cache, a fully-associative cache, or a set-associative cache.

Loop count cache control logic 420 thus conveys cache address 424 to loop count cache 430, as well as asserting cache read/write signal 422 to indicate a valid cache read. If loop count cache 430 does not contain a match for cache address 424, cache hit signal 426 is not asserted to loop count cache control logic 420. In turn, cache valid signal 414 is not asserted to BPU loop state machine controller 410. This indicates that, as before, shadow counter register 170 contents are not valid until counter valid signal 306 is received from reorder buffer 32. Compare valid signal 318 therefore remains inactive. When counter valid 306 is asserted, counter register value 304 is conveyed to counter source multiplexer 440. BPU loop state machine controller 410 selects counter register value 304 by asserting counter source select 418. Counter register value 304 is thereby conveyed to shadow counter register 170, where it is written upon assertion of counter register write enable 305, driven by controller 410.

Additionally, counter register value 304 is conveyed to loop count cache control logic 420. Upon receiving counter valid signal 306, BPU loop state machine controller 410 conveys write cache signal 416 to loop count cache control logic 420. This causes loop count cache control logic 420 to select a location within loop count cache 430 based on replacement policy and cache organization, and write counter register value 304 to this location. Cache read/write signal 422 is asserted to indicate a valid write, cache address 424 conveys the cache address, and write value bus 428 conveys the address tag value derived from instruction fetch address 234 and the loop count received on counter register value 304.

If loop count cache 430 does contain a match for the read request transmitted from loop count cache control logic 420, cache hit signal 426 is asserted to loop count cache control logic 420. Additionally, cache loop count value 432 is conveyed to counter source multiplexer 440. In response to receiving an asserted cache hit signal 426, loop count cache control logic 426 conveys cache valid signal 414 to BPU loop state machine controller 410. This causes counter source select signal 418 to select cache loop count value 432 from multiplexer 440, conveying the result to shadow counter register 170, where it is stored upon receiving counter register write enable signal 305.

Cache valid signal 414 also causes compare valid signal 318 to become active. That is, as soon as a value is returned from loop count cache 430 and stored in shadow counter register 170, predictions may be made based on this value. The signal to reorder buffer 32 is still made via counter register request 316, with the result being conveyed on counter register value 304 and qualified by counter valid signal 306. When this value is returned, it is stored into shadow counter register 170, overwriting the value read from loop count cache 430 (even if the current values are the same). The value returned from reorder buffer 32 is considered the more reliable value. Cache loop count value 432 is used as a backup when counter register value 304 is not available quickly. Again, counter register value 304 is written to loop count cache, although in this instance, there will already be an entry for the address. The loop count field for the location will be updated correspondingly. In one embodiment, counter register value 304 will only be written to loop count cache 304 if it is less than a predetermined value (which indicates it is likely to be mispredicted due to a short loop predict length).

Figure 10:
FIG. 10 is a pseudo-code sequence depicting one example of nested loops.

Turning now to FIG. 10, a sequence of pseudo-code depicting one example of nested loops is shown. Nested loops are formed in code sequences when one loop wholly contains another loop. In the pseudo-code sequence shown in FIG. 10, the two inner loops are said to be nested within the outermost loop, and the innermost loop is said to be nested within the two outermost loops. Nested loops are useful in a variety of programming applications such as traversal of multidimensional arrays.

Nested loop structures are problematic for loop prediction units as described above. Consider a program that includes a inner loop nested inside an outer loop. The inner loop will execute first and may be predicted in accordance with techniques described above. After the inner loop finishes execution, the loop instruction corresponding to the outer loop is encountered. At this point, the loop prediction unit requests a counter register value corresponding to updates to counter register received at that point in program execution. Program execution then continues with another execution of the inner loop. At this point, the loop prediction unit is already processing the outer loop. When the initial loop instruction from the inner loop is again processed, the loop prediction unit will erroneously treat this loop instruction as a second iteration of the outer loop (instead of a first iteration of a new loop), since it has no way to distinguish between different loop instructions. As loop execution continues, it is likely that the inner loop will thus be predicted incorrectly after a first detection of the loop instruction in the outer loop.

Figure 11:
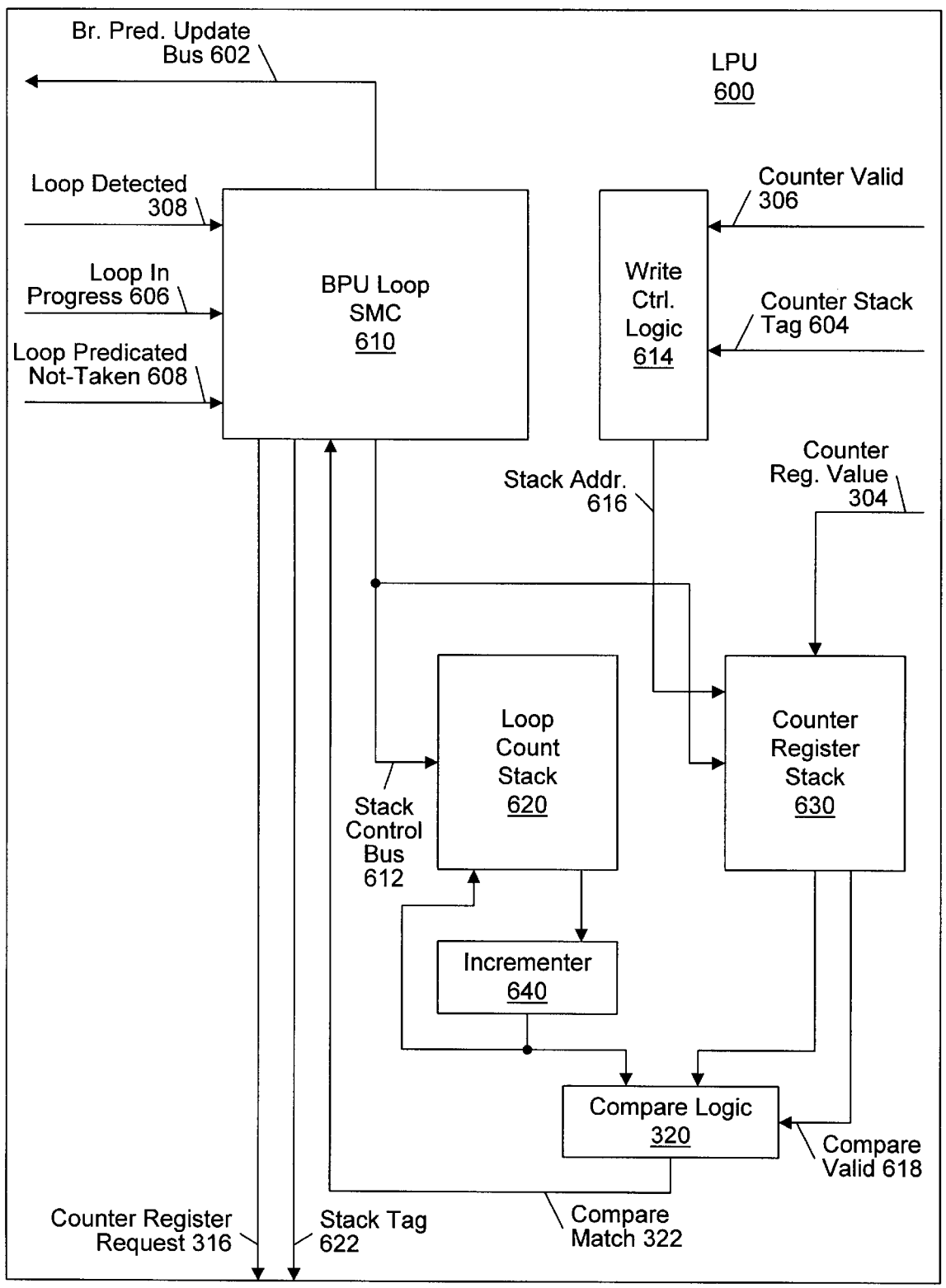
FIG. 11 is a block diagram of one embodiment of a loop prediction unit employing stacks for storing loop count and counter register values.

Turning now to FIG. 11, a block diagram of a loop prediction unit including a loop count stack and counter register stack is shown. As depicted, loop prediction unit 600 includes a BPU loop state machine controller 610, a write control logic block 614, a loop count stack 620, a counter register stack 630, an incrementer 640, and compare logic block 320. BPU loop state machine controller 610 receives loop detected signal 308, a loop in progress signal 606 and loop predicted not-taken signal 608 from a branch prediction block selected from branch prediction storage 62. Controller 610 additionally receives compare match signal 322. Updates to branch prediction blocks are conveyed to branch prediction update logic 64 on branch prediction update bus 602. BPU loop state machine controller conveys counter register request signal 316 and a stack tag bus 622 to instruction alignment unit 18. Write control logic 614 receives counter valid signal 306 and counter stack tag bus 604 from reorder buffer 32, and conveys stack address 616 to counter register stack 630. Loop count stack 620 receives a stack control bus 612 from BPU loop state machine controller 610, and conveys a loop count value to incrementer 640. Incrementer 640 adds one to this value and conveys the output to compare logic 320. Counter register stack 630, in addition to receiving stack control bus 612, receives stack address 616 and counter register value 304, and conveys a counter register value and a compare valid signal 618 to compare logic 320. Compare logic 320 conveys compare match signal 322 to controller 610 in response to the value conveyed from incrementer 640 and counter register stack 630 being equal, and compare valid signal 618 being asserted.

Loop prediction unit 600, in conjunction with additional information added to the branch prediction blocks stored in branch prediction storage 62, may be used to facilitate prediction of nested loops. In one embodiment, two additional bits are added to each branch prediction block: a loop in progress bit and a loop predicted not-taken bit. When a branch prediction block is initialized, both of these bits are cleared. When loop detected signal 308 is conveyed to loop prediction unit 600, the loop in progress bit is conveyed as loop in progress signal 606, and the loop predicted not-taken bit is conveyed as loop predicted not-taken signal 608. Loop in progress signal 606 indicates that loop prediction unit 600 is currently processing this loop. Loop predicted not-taken signal 608 indicates that this is the last iteration of the loop; therefore, branch prediction unit 14 will predict this loop instruction to be not-taken. These signals are received by BPU loop state machine controller 610 upon each instance of a loop instruction predicted by branch prediction unit 14.

Because loop prediction unit 600 may be processing more than one loop at a time, loop count stack 620 and counter register stack 630 may be used to store multiple loop count values and multiple compare values for outstanding loops being processed. When a new loop is detected (as will be described below), a new entry may be allocated in loop count stack 620 and counter register stack 630. This operation may be referred to as a "push", and is performed via stack control bus 612. The new entry is then said to be at the "top" of loop count stack 620 and counter register stack 630. The loop remains at the top of stacks 620 and 630 until the loop completes execution or a nested loop is encountered. If the loop completes execution, the entry is de-allocated from the top of loop count stack 620 and counter register stack 630. This operation may be referred to as a "pop", and is performed via stack control bus 612. If a nested loop is encountered, a new entry is pushed on to stacks 620 and 630.

When BPU loop state machine controller 610 receives an asserted loop detected signal 308 and a de-asserted loop in progress signal 606, this is an indication that a new loop has been detected. Controller 610 pushes a new entry on loop count stack 620 and counter register stack 630. The new value on loop count stack 620 may be initialized to zero by the push operation, and incremented via another operation on stack control bus 612 which increments the value on the top of loop count stack 620. The value on the top of counter register stack is not yet valid when it is allocated. BPU loop state machine controller 610 thus initiates a request for a counter register value by asserting counter register request signal 316. Reorder buffer 32 subsequently provides the requested counter register value. In addition, controller 610 conveys stack tag bus 622 which indicates a location within counter register stack 630.

When reorder buffer 32 receives a request for a counter register value from loop prediction unit 600, it conveys an asserted counter valid signal 306, the requested counter value on counter register value bus 304, and the stack location on counter stack tag bus 604. The value on counter stack tag bus 604 is equal to the value originally conveyed on stack tag bus 622 when the counter value was requested. The stack tag is used to identify the correct location in counter register stack 630 to update, since additional entries may have pushed on to stack 630.

When write control logic 614 receives an asserted counter valid 306, the value on counter stack tag bus 604 is conveyed as stack address 616 to counter register stack 630. This causes the data on counter register value bus 304 to be conveyed to the stack location specified by stack address 616. If the value on top of counter register stack 630 is valid, compare valid signal 618 is conveyed to compare logic 320.

When BPU loop state machine controller 610 receives an asserted loop detected signal 308 and an asserted loop in progress signal 606, an increment operation is performed via stack control bus 612 on the value on the top of loop count stack 620. This value is conveyed to incrementer 640 and the output conveyed to compare logic 320, along with the value on top of counter register stack 630. If this value is valid (indicated by compare valid signal 618), compare logic 320 will assert compare match signal 322 to controller 610.

Consider a program execution in which a inner loop is nested inside a outer loop. The loop in progress and loop predicted not-taken bits in the branch prediction blocks corresponding to both loops are initially cleared. When the first indication of the loop instruction in the inner loop is conveyed to loop prediction unit 600, loop detected signal 308 will be asserted and loop in progress signal 606 will be de-asserted. Controller 610 will therefore push an entry on to loop count stack 620 and counter register stack 630. The loop count stack 620 will be initialized to zero and incremented by a subsequent operation. A request for a counter register value will be conveyed to reorder buffer 32 by counter register request 316 and stack tag bus 622. Also, the branch prediction block corresponding to the loop will be updated via branch prediction update bus 602 so that the loop in progress bit is set.

Subsequent indications of the loop instruction in the inner loop will cause the value on the top of loop count stack 620 to be incremented. This value is then conveyed to incrementer 640 and the output conveyed to compare logic 320. Compare logic 320 compares the output of incrementer 640 and the value on the top of counter register stack 630. This value is written by write control logic when counter valid signal 306 is asserted by reorder buffer 32, along with counter stack tag bus 604. When the value on the top of counter register stack 630 is valid, compare valid 618 will be asserted, and a valid compare may take place.

When compare match signal 322 is asserted, the branch prediction block corresponding to the loop instruction is updated to set the loop predicted not-taken bit. During the final iteration of the loop, branch prediction unit 14 predicts the loop instruction not-taken in response to the loop predicted not-taken bit being set. Upon receiving a subsequent loop indication in which loop predicted not-taken signal 608 is asserted, the branch prediction block is again updated to clear the loop in progress and loop predicted not-taken bits. Furthermore, an entry is popped from loop count stack 620 and counter register stack 630.

Subsequent to the first iteration of the inner loop being performed, a loop instruction corresponding to the first iteration of the outer loop is detected. As before, a new entry is pushed on stacks 620 and 630. As execution of this loop commences, however, the loop instruction from the inner loop is then encountered. Since this loop will be conveyed to loop prediction unit 600 without loop in progress signal 606 being asserted, another entry is pushed on to stacks 620 and 630. Loop prediction unit 600 will then operate on the inner loop until it is complete. At this point, the inner loop entry will be popped from stacks 620 and 630, and execution will resume with the saved values of the loop count and counter register (conveyed from reorder buffer 32) corresponding to the outer loop. In this manner, nested loop prediction accuracy may be increased.

Figure 12:
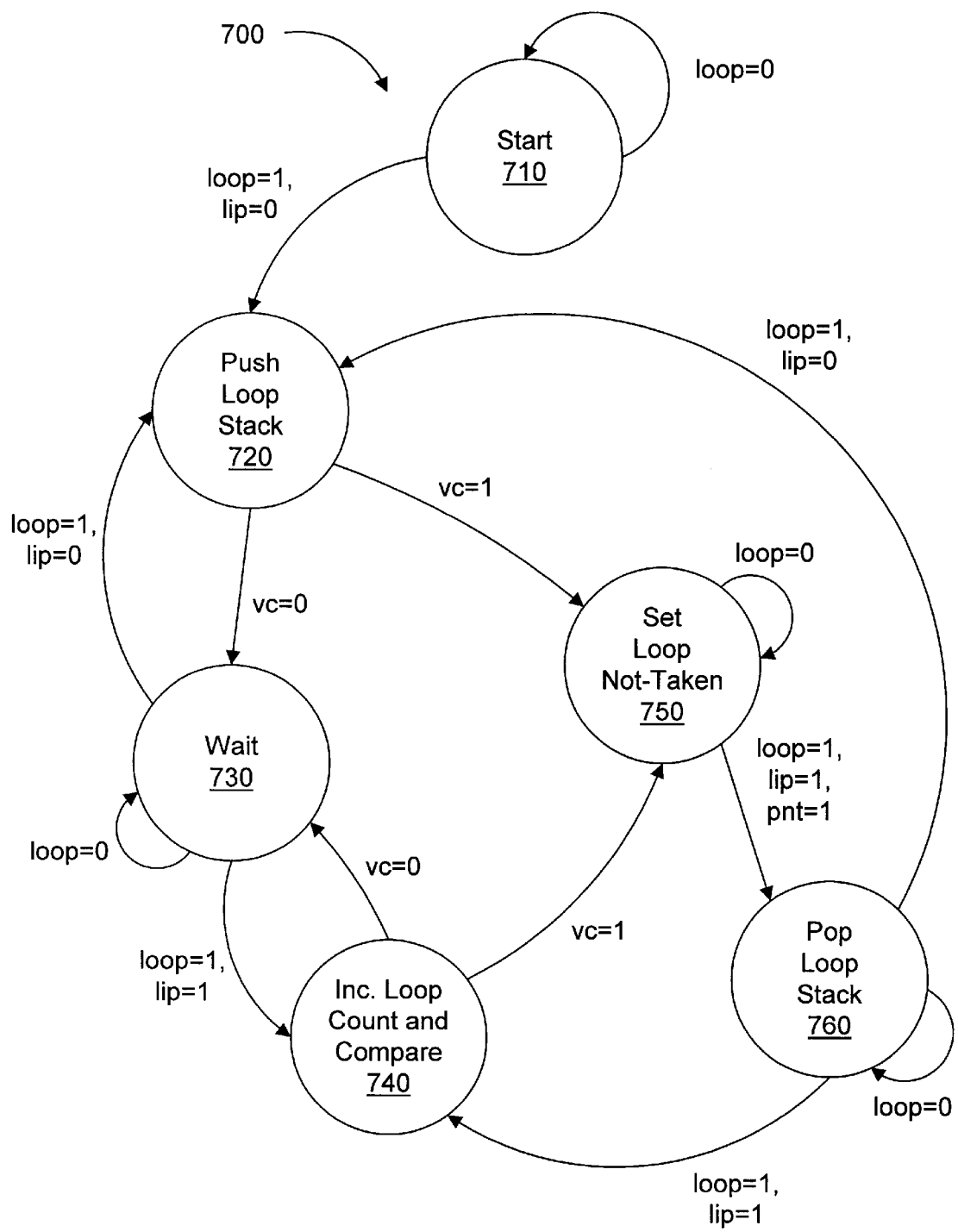
FIG. 12 is a depiction of operation of one embodiment of loop state machine controller 610 shown in FIG. 11.

Turning now to FIG. 12, a state machine 700 is shown which depicts operation of BPU loop state machine controller 610. State machine 700 includes a start state 710, a push loop stack 720, a wait state 730, a increment loop count and compare state 740, a set loop not-taken state 750, and a pop loop stack state 760. Transitions in state machine 700 are labeled with "loop", "lip", "pnt", and "vc". The label "loop" corresponds to the value on loop detected signal 308, while "lip" corresponds to the value on loop in progress signal 606 and "pnt" corresponds to the value on loop predicted not-taken signal 608. Additionally, "vc" corresponds to the value on compare match signal 322.

State machine 700 is initialized in start state 710, and remains there until loop detected signal 308 is asserted. State machine 700 then transitions to push loop stack state 720. As described above, this causes a new entry to be pushed on stacks 620 and 630, as well as initiating a request to reorder buffer 32 for a counter register value and setting the loop in progress bit in the branch prediction block of the loop instruction. Additionally, a compare is performed by compare logic 320. Upon compare match signal 322 being inactive, state 730 is entered. If compare match signal 322 is active in state 720, set loop not-taken state 750 is entered. State machine remains in wait state 730 until a subsequent loop detected signal 308 is asserted. If loop in progress bit 606 is not set, state machine 700 re-enters state 720, with a new entry being pushed on stacks 620 and 630, and a new counter register request being initiated to reorder buffer 32. If loop in progress bit 606 is set, increment loop count and compare state 740 is entered. The entry on top of stack 620 is incremented and another compare is performed by compare logic 320. If compare match signal 322 is inactive, state machine 700 returns to state 730. If compare match signal 322 is active, set loop not-taken state 750 is entered. This causes the loop predicted not-taken bit to be set in the branch prediction block corresponding to the loop instruction. When a subsequent loop (with loop predicted not-taken signal 608 asserted) is detected, pop loop stack 760 is entered. State machine 700 remains here until receiving a subsequent loop indication. If the corresponding loop in progress signal 606 is inactive, state machine 700 transitions to state 720. If loop in progress signal 606 is active, state 740 is re-entered.

It is noted that in an alternative embodiment, a loop prediction unit may be configured to additionally handle microcode loops. For example, the x86 "STRING" instruction, which is performed in microcode, also uses ECX as the counter register to control looping. In this embodiment, the loop prediction unit may be employed to improve prediction of microbranches.

It is further noted that in a different embodiment, a loop prediction unit may be configured to additionally detect and predict implicit loop operations. For example, an instruction may be detected which performs an arithmetic operation (typically either an add or subtract of an immediate value) which modifies the counter register immediately followed by an branch instruction which branches to a specified target address if the counter register is zero. In this embodiment, the loop prediction unit may be configured to detect such a sequence as an implicit loop. In such a case, the loop prediction unit repeats the arithmetic operation upon each detection of the branch, and uses the result of this repeated arithmetic operation to predict when the branch is not-taken.

Numerous variations and modifications will become apparent to those skilled in the art once the above disclosure is fully appreciated. It is intended that the following claims be interpreted to embrace all such variations and modifications.

What is claimed is:

1. A method for predicting a loop instruction, comprising:

detecting said loop instruction during each of an initial and subsequent iterations of a loop defined by said loop instruction;

conveying an initial and subsequent indications of the detected loop instruction to a loop prediction circuit;

conveying an initial loop count to the loop prediction circuit in response to the loop prediction circuit receiving the initial indication, wherein said initial loop count comprises a value stored in a specified register prior to any iteration of the loop containing the detected loop instruction, and wherein an execution of said detected loop instruction decrements a value stored in said specified register at the time the detected loop instruction is executed, and wherein the execution of the detected loop instruction causes a branch unless said decremented value is equal to zero;

incrementing a counter value in response to the loop prediction circuit receiving said initial and subsequent indications;

determining whether a difference between said incremented counter and said initial loop count is a given value, wherein said given value is determined as a function of a number of instructions in the loop and a number of pipeline stages prior to said loop prediction unit;

predicting a not-taken outcome for said detected loop instruction in response to determining that the difference between said incremented counter and said initial loop count is the given value.

2. The method for predicting a loop instruction as recited in claim 1 wherein said given value is one.

3. The method for predicting a loop instruction as recited in claim 1 further comprising disabling updates to said initial loop count subsequent to said conveying said initial loop count to said loop prediction unit.

4. The method for predicting a loop instruction as recited in claim 3 further comprising enabling updates to said initial loop count in response to a subsequent indication received during a last of said one or more iterations of said loop.

5. The method for predicting a loop instruction as recited in claim 3 further comprising resetting said counter value in response to a subsequent indication received during a last of one or more iterations of said loop.

6. The method for predicting a loop instruction as recited in claim 1 wherein said initial loop count is stored in a reorder buffer coupled to the loop prediction circuit, and wherein the initial loop count is conveyed from the reorder buffer to the loop prediction circuit.

7. The method for predicting a loop instruction as recited in claim 1 wherein said initial loop count is conveyed from a loop count cache coupled to the loop prediction circuit, wherein said loop count cache includes a copy of a value stored in said specified register prior to detecting said loop instruction.

8. An apparatus for predicting a loop instruction, comprising:
   a loop detection circuit configured to detect said loop instruction during each of an initial and subsequent iterations of a loop defined by said loop instruction, wherein the loop detection circuit is configured to convey initial and subsequent indications of the detected loop instruction to a loop prediction circuit in response to detecting said loop instruction during each of the initial and subsequent iterations of the loop, wherein an execution of said loop instruction decrements a value stored in a specified register at the time the detected loop instruction is executed, and wherein the execution of the detected loop instruction causes a branch unless said decremented value is equal to zero;
   a reorder buffer configured to convey an initial loop count in response to said initial indication, wherein said initial loop count is defined by a value stored in the specified register prior to execution of any loop containing the detected loop instruction;
   the loop prediction circuit coupled to receive said initial and subsequent indications from said loop detection circuit and said initial loop count from said reorder buffer, and wherein said loop prediction circuit is configured to increment a counter value and compare said counter value to said initial loop count upon receiving said initial and subsequent indications to determine whether a difference between the incremented counter value and the initial loop count is a given value, wherein said given value is determined as a function of a number of instructions in the loop and a number of pipeline stages prior to said loop prediction unit, and wherein said loop prediction circuit is further configured to signal a not-taken prediction for said detected loop instruction in response to determining the difference between said incremented counter value and said initial loop count is the given value.

9. The apparatus for predicting a loop instruction as recited in claim 8, wherein said given value is one.

10. The apparatus for predicting a loop instruction as recited in claim 8, wherein said loop detection circuit is located within a decode unit, and wherein said detecting said loop instruction is performed by a decode of said loop instruction.

11. The apparatus for predicting a loop instruction as recited in claim 8 wherein said loop prediction unit is further configured to reset said counter value in response to a subsequent indication received during a last of said one or more iterations of said loop.

12. The apparatus for predicting a loop instruction as recited in claim 8 wherein said initial loop count is stored on an initial loop count stack, wherein said initial loop count stack includes initial loop counts corresponding to other loops which are in execution.

13. The apparatus for predicting a loop instruction as recited in claim 12 wherein said counter value is stored on a counter value stack, wherein said counter value stack includes counter values corresponding to other loops which are in execution.

14. A superscalar microprocessor, comprising:
   a branch prediction unit configured to predict a loop instruction;
   a loop detection circuit coupled to receive said loop instruction from an instruction cache and configured to convey an indication thereof;
   a reorder buffer configured to convey an initial loop count in response to receiving said initial indication conveyed by said loop detection circuit, wherein said initial loop count comprises a value stored in a specified register prior to any iteration of a loop containing the detected loop instruction;
   a loop prediction circuit coupled to receive said initial loop count from said reorder buffer and said initial and subsequent indications from said loop detection circuit, wherein said loop prediction circuit is configured to increment a counter value and compare said counter value to said initial loop count each time the initial or subsequent indication is received, and wherein said loop prediction unit is further configured to convey a not-taken indication to said branch prediction unit for said detected loop instruction in response to said counter value being less than said initial loop count by a given value, wherein said given value is determined as a function of a number of instructions in the loop and a number of pipeline stages prior to said loop prediction unit.

15. A superscalar microprocessor as recited in claim 14 wherein said given value is one.

16. The superscalar microprocessor as recited in claim 14, wherein said loop detection unit is located within a decode unit, and wherein said detecting said loop instruction is performed by a decode of said detected loop instruction.

17. The superscalar microprocessor as recited in claim 14 wherein branch prediction unit predicts a taken outcome for said detected loop instruction unless said not-taken indication is conveyed from said loop prediction circuit.

18. The superscalar microprocessor as recited in claim 14 wherein said compare value is stored on a compare value stack, wherein said compare value stack includes compare values corresponding to other loops which are in execution.

19. The superscalar microprocessor as recited in claim 18 wherein said counter value is stored on a counter value stack, wherein said counter value stack includes counter values corresponding to other loops which are in execution.

* * * * *